United States Patent
Shannon et al.

(10) Patent No.: US 10,323,140 B2
(45) Date of Patent: Jun. 18, 2019

(54) THERMOPLASTIC VULCANIZATES COMPRISING BROAD MOLECULAR WEIGHT DISTRIBUTION POLYPROPYLENE

(71) Applicant: ExxonMobil Chemical Patents Inc., Baytown, TX (US)

(72) Inventors: Porter C. Shannon, Seabrook, TX (US); Oscar O. Chung, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/132,484

(22) Filed: Apr. 19, 2016

(65) Prior Publication Data

US 2016/0347946 A1    Dec. 1, 2016

Related U.S. Application Data

(60) Provisional application No. 62/168,016, filed on May 29, 2015.

(51) Int. Cl.
    *C08L 23/12*    (2006.01)
(52) U.S. Cl.
    CPC ............ *C08L 23/12* (2013.01); *C08L 2205/02* (2013.01); *C08L 2205/025* (2013.01); *C08L 2205/03* (2013.01); *C08L 2205/06* (2013.01); *C08L 2205/22* (2013.01)
(58) Field of Classification Search
    CPC ...... C08L 23/12; C08L 23/16; C08L 2205/02; C08L 2205/025; C08L 2205/03; C08L 2205/06; C08L 2205/22
    See application file for complete search history.

(56) References Cited

U.S. PATENT DOCUMENTS

| | | | | |
|---|---|---|---|---|
| 4,803,244 A | * | 2/1989 | Umpleby | C08F 8/42 428/447 |
| 5,786,403 A | | 7/1998 | Okada et al. | |
| 2005/0245679 A1 | * | 11/2005 | Ajbani | C08L 21/00 525/66 |
| 2006/0281868 A1 | * | 12/2006 | Sudhin | C08L 23/08 525/240 |
| 2008/0051516 A1 | * | 2/2008 | Hu | C08L 21/00 525/191 |
| 2015/0252127 A1 | * | 9/2015 | Meka | C08F 110/06 252/500 |

FOREIGN PATENT DOCUMENTS

| | | |
|---|---|---|
| EP | 1 634 818 | 3/2006 |
| EP | 1 634 919 | 3/2006 |
| WO | 99/64510 | 12/1999 |
| WO | 2007/142742 A | 12/2007 |
| WO | WO2009/020720 | 2/2009 |
| WO | 2014/070384 | 5/2014 |
| WO | 2014/070385 | 5/2014 |
| WO | 2014/070386 | 5/2014 |

OTHER PUBLICATIONS

Bremner, T., et al.; Journal of Applied Polymer Science, vol. 41, Issue 7-8, p. 1617-1627.*

* cited by examiner

*Primary Examiner* — Robert S Jones

(57) ABSTRACT

Provided herein are thermoplastic vulcanizates that comprise rubber, broad molecular weight distribution polypropylene, and oil, where the rubber forms a rubber phase that is dispersed and at least partially cross-linked within a continuous thermoplastic component that comprises the broad molecular weight distribution polypropylene. The broad molecular weight distribution polypropylene preferably has a molecular weight distribution (Mw/Mn) of greater than 4; a melt flow rate of greater than 1 g/10 min; and a weight average molecular weight (Mw) of greater than 380,000 daltons.

20 Claims, 4 Drawing Sheets ated on May 29, 2015.

THERMOPLASTIC VULCANIZATES COMPRISING BROAD MOLECULAR WEIGHT DISTRIBUTION POLYPROPYLENE

PRIORITY

This invention claims priority to and the benefit of U.S. Ser. No. 62/168,016, filed on May 29, 2015.

FIELD OF THE INVENTION

Described herein are thermoplastic vulcanizates comprising at least one polypropylene that has a broad molecular weight distribution.

BACKGROUND OF THE INVENTION

Thermoplastic vulcanizates ("TPVs") are vulcanized compositions that include finely dispersed crosslinked elastomeric particles in a continuous thermoplastic phase. TPVs are produced by a process called dynamic vulcanization where the elastomeric component is selectively crosslinked during melt mixing under conditions of shear and temperature with the thermoplastic resins. TPVs have the benefits of the elastomeric properties provided by the elastomer phase and the processability provided by the thermoplastic phase.

Conventional TPVs are made using polypropylene as a thermoplastic component. The polypropylene typically has a fractional melt flow rate, such as a melt flow rate of less than 1 g/10 min, and a narrow molecular weight distribution, such as from about 2 to 4. However, TPVs containing such fractional polypropylenes can be difficult to process. That is, when producing either the TPV or a final end-use article comprising the TPV, the production equipment can be rate limited by the high viscosity of the polypropylene phase due to (i) the increased gear box torque and/or pressures that result from extruding the high viscosity polypropylene, and/or (ii) the increased melt temperatures needed to process the high viscosity polypropylene.

As described in PCT Publication No. WO 99/64510, attempts have been made to produce TPVs with improved processability using a mixture of olefinic rubber and a polypropylene blend composition having a melt flow rate of 0.5 to 5 g/10 min and a Mw/Mn of 5.5 to 20. However, the need to prepare a mixture of polypropylenes complicates the manufacturing process. PCT Publication No. WO 99/64510 also describes the use of reactor blended polypropylenes. However, the reactor blended polypropylenes in PCT Publication No. WO 99/64510 have a low molecular weight which can negatively impact physical properties of the TPV, such as tensile properties and melt strength.

Additional background references include PCT Publication Nos. WO 2014/070384; WO 2014/070385; and WO 2014/070386.

Therefore, there is still a need for TPVs that have improved extruder processability for the consumer as well as ease of manufacture without sacrificing the mechanical properties of the TPV.

SUMMARY OF THE INVENTION

Figure 1:
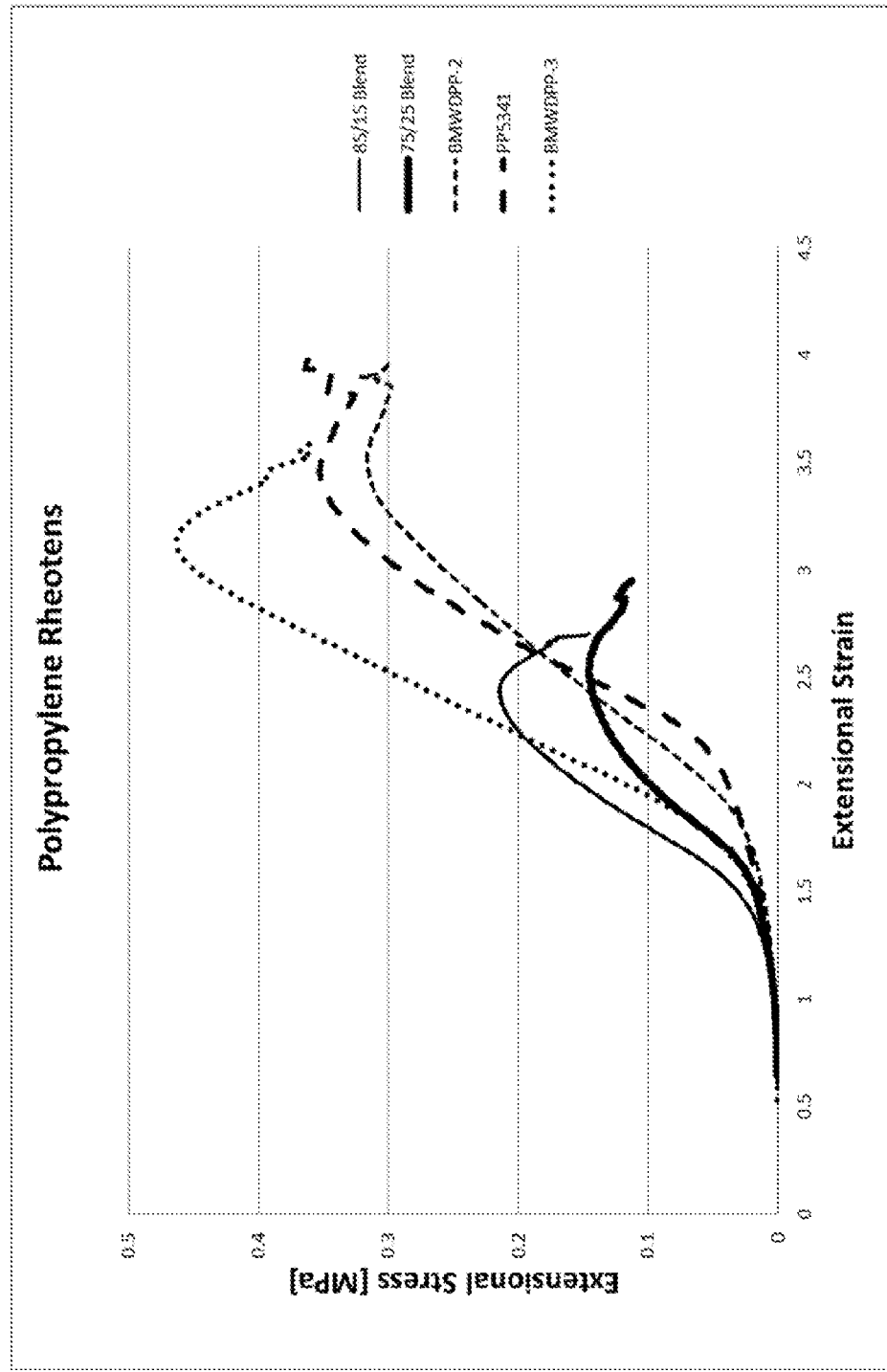
FIG. 1 shows the melt strength of different polypropylenes and polypropylene blends used in the examples.

Provided herein are thermoplastic vulcanizates ("TPVs") that comprise broad molecular weight distribution polypropylenes ("BMWDPP"). The BMWDPPs beneficially have a low viscosity (as indicated by the melt flow rate) and an increased melt strength, which provide the TPV with improved processability as compared to TPVs utilizing fractional polypropylenes.

The thermoplastic vulcanizates described herein comprise rubber, broad molecular weight distribution polypropylene, and oil, where the thermoplastic vulcanizate comprises a rubber phase that is dispersed and at least partially crosslinked within a continuous thermoplastic component that comprises the broad molecular weight distribution polypropylene. The broad molecular weight distribution polypropylene preferably has a molecular weight distribution (Mw/Mn) of greater than 4; a melt flow rate (ASTM D1238 Condition L at 230° C. and 2.16 kg) of greater than 1 g/10 min; and a weight average molecular weight (Mw) of greater than 380,000 daltons.

DETAILED DESCRIPTION OF THE INVENTION

Various specific embodiments and versions of the present invention will now be described, including preferred embodiments and definitions that are adopted herein. While the following detailed description gives specific preferred embodiments, those skilled in the art will appreciate that these embodiments are exemplary only, and that the present invention can be practiced in other ways. Any reference to the "invention" may refer to one or more, but not necessarily all, of the embodiments defined by the claims. The use of headings is for purposes of convenience only and does not limit the scope of the present invention.

All numerical values within the detailed description and the claims herein are modified by "about" or "approximately" the indicated value, and take into account experimental error and variations that would be expected by a person having ordinary skill in the art.

As used herein, a "thermoplastic vulcanizate" or "TPV" is broadly defined as any material that includes a dispersed, at least partially vulcanized or fully vulcanized, rubber within a thermoplastic resin. A TPV composition can further include oil, additives, and combinations thereof.

As used herein, the term "vulcanizate" means a composition that includes some component (e.g., rubber) that has been vulcanized. The term "vulcanized" is defined herein in its broadest sense, and refers in general to the state of a composition after all or a portion of the composition (e.g., crosslinkable rubber) has been subjected to some degree or amount of vulcanization. Accordingly, the term encompasses both partial and total vulcanization. A preferred type of vulcanization is "dynamic vulcanization," discussed below, which also produces a "vulcanizate." In at least that context, the term vulcanization encompasses any form of curing (crosslinking), both thermal and chemical, which can be utilized in dynamic vulcanization.

As used herein, the term "dynamic vulcanization" means vulcanization or curing of a curable rubber blended with a thermoplastic resin under conditions of shear at temperatures sufficient to plasticize the mixture. In preferred embodiments, the rubber is simultaneously crosslinked and dispersed within the thermoplastic resin. Depending on the degree of cure, the rubber to thermoplastic resin ratio, compatibility of the rubber and thermoplastic resin, the kneader type and the intensity of mixing (shear rate), other morphologies, such as co-continuous rubber phases in the plastic matrix, are possible.

As used herein, a "partially vulcanized" rubber is one wherein more than 5 weight percent (wt %) of the crosslinkable rubber is extractable in boiling xylene, subsequent to vulcanization (preferably dynamic vulcanization), e.g., crosslinking of the rubber phase of the TPV. For example, in a TPV comprising a partially vulcanized rubber at least 5 wt % and less than 20 wt %, or 30 wt %, or 50 wt % of the crosslinkable rubber can be extractable from the specimen of the TPV in boiling xylene.

Preferably, the percent of soluble rubber in the cured composition is determined by refluxing a specimen in boiling xylene, weighing the dried residue and making suitable corrections for soluble and insoluble components based upon knowledge of the composition. Thus, corrected initial and final weights are obtained by subtracting from the initial weight of the soluble components, other than the rubber to be vulcanized, such as extender oils, plasticizers, and components of the compositions soluble in organic solvent, as well as thermoplastic components that are not intended to cure. Any insoluble pigments, fillers, etc., are subtracted from both the initial and final weights. Any materials in the uncured rubber that are soluble in refluxing xylene are subtracted from the rubber when calculating the percent of soluble rubber in a cured composition. A further description of the technique for determining the percentage of extractable rubber is set forth in U.S. Pat. No. 4,311,628, and the portions of the patents referring to that technique are hereby incorporated by reference.

As used herein, a "fully vulcanized" (or fully cured or fully crosslinked) rubber is one wherein less than 5 wt % of the crosslinkable rubber is extractable in boiling xylene, subsequent to vulcanization (preferably dynamic vulcanization), e.g., crosslinking of the rubber phase of the TPV. For example, in a TPV comprising a fully vulcanized rubber less than 4 wt %, or less than 3 wt %, or less than 2 wt %, or less than 1 wt % of the crosslinkable rubber can be extractable from the specimen of the TPV in boiling xylene. In some embodiments, in a TPV comprising a fully vulcanized rubber from 0.5 to 2.0 wt % of the crosslinkable rubber can be extractable from the specimen of the TPV in boiling xylene.

As used herein "phr" means parts per hundred parts of rubber. Thus, for example, a TPV that comprises 10 phr of an additive, contains 10 parts by weight of the additive per 100 parts by weight of the rubber in the TPV.

For the purposes herein, the new numbering scheme for the Periodic Table Groups is used as in Chem. Eng. News, 1985, 63, 27. Therefore, a "Group 4 metal" is an element from Group 4 of the Periodic Table.

Polypropylene microstructure can be determined by $^{13}$C-NMR spectroscopy, including the concentration of isotactic and syndiotactic diads ([m] and [r]), triads ([mm] and [rr]), and pentads ([mmmm] and [rrrr]). The designation "m" or "r" describes the stereochemistry of pairs of contiguous propylene groups, "m" referring to meso, and "r" to racemic. Samples are dissolved in $d_2$-1,1,2,2-tetrachloroethane, and spectra recorded at 125° C. using a 100 MHz (or higher) NMR spectrometer. Polymer resonance peaks are referenced to mmmm=21.8 ppm. Calculations involved in the characterization of polymers by NMR are described by F. A. Bovey in Polymer Conformation and Configuration (Academic Press, New York 1969) and J. Randall in Polymer Sequence Determination, $^{13}$C-NMR Method (Academic Press, New York, 1977).

The terms "catalyst" and "catalyst compound" are defined to mean a compound capable of initiating polymerization catalysis under the appropriate conditions. In the description herein, the catalyst may be described as a catalyst precursor, a pre-catalyst compound, or a transition metal compound, and these terms are used interchangeably. A catalyst compound may be used by itself to initiate catalysis or may be used in combination with an activator, an internal electron donor, one or more external electron donors, and/or a co-catalyst to initiate catalysis. When the catalyst compound is combined with electron donors and/or co-catalysts to initiate catalysis, the catalyst compound is often referred to as a pre-catalyst or catalyst precursor. A "catalyst system" is a combination of at least one catalyst compound, at least one internal electron donor, one or more external electron donors, a co-catalyst, and/or a support where the system can polymerize monomers to produce a polymer under polymerization conditions of suitable temperature and pressure. For the purposes herein, when catalyst systems are described as comprising neutral stable forms of the components, it is well understood by one of ordinary skill in the art that the ionic form of the component is the form that reacts with the monomers to produce polymers.

As used herein, Mn is number average molecular weight, Mw is weight average molecular weight determined, and Mz is the z-average molecular weight. Molecular weight distribution (MWD) is defined to be Mw divided by Mn. Unless otherwise noted, all molecular weight units, e.g., Mw, Mn, Mz, are in daltons (1 dalton=1 g/mol).

The number-average molecular weight (Mn), weight-average molecular weight (Mw), and z-average molecular weight (Mz), were determined by using a High Temperature Gel Permeation Chromatography (GPC-3D) (Agilent PL-220), equipped with three in-line detectors, a differential refractive index detector (DRI), a light scattering (LS) detector, and a viscometer. Experimental details, including detector calibration, are described in: T. Sun, P. Brant, R. R. Chance, and W. W. Graessley, Macromolecules, Volume 34, Number 19, 6812-6820, (2001), and references therein. Three Polymer Laboratories PLgel 10 mm Mixed-B LS columns are used. The nominal flow rate is 0.5 cm$^3$/min, and the nominal injection volume is 300 µL. The various transfer lines, columns and differential refractometer (the DRI detector) are contained in an oven maintained at 145° C. Solvent for the experiment is prepared by dissolving 6 grams of butylated hydroxy toluene as an antioxidant in 4 liters of Aldrich reagent grade 1, 2, 4 trichlorobenzene (TCB). The TCB mixture is then filtered through a 0.7 µm glass pre-filter and subsequently through a 0.1 µm Teflon filter. The TCB is then degassed with an online degasser before entering the Size Exclusion Chromatograph. Polymer solutions are prepared by placing dry polymer in a glass container, adding the desired amount of TCB, then heating the mixture at 160° C. with continuous agitation for 2 hours. All quantities are measured gravimetrically. The TCB densities used to express the polymer concentration in mass/volume units are 1.463 g/ml at room temperature and 1.324 g/ml at 145° C.

The injection concentration is from 0.75 to 2.0 mg/ml, with lower concentrations being used for higher molecular weight samples. Prior to running each sample the DRI detector and the injector are purged. Flow rate in the apparatus is then increased to 0.5 ml/minute, and the DRI is allowed to stabilize for 8 to 9 hours before injecting the first sample. The LS laser is turned on 1 to 1.5 hours before running the samples. The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. The refractive index, n=1.500 for TCB at 145° C. and 0.1=690 nm. For purposes of this invention and the claims thereto (dn/dc)=0.104 for propylene polymers, 0.098 for butene polymers and 0.1 otherwise. Units on parameters throughout this description of the SEC method are such that concentration is expressed in g/cm³, molecular weight is expressed in daltons, and intrinsic viscosity is expressed in dL/g.

The LS detector is a Wyatt Technology High Temperature mini-DAWN. The molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle $\theta$, c is the polymer concentration determined from the DRI analysis, $A_2$ is the second virial coefficient [for purposes of this invention, $A_2$=0.0006 for propylene polymers, 0.0015 for butene polymers and 0.001 otherwise], (dn/dc)=0.104 for propylene polymers, 0.098 for butene polymers, and 0.1 otherwise, $P(\theta)$ is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and λ=690 nm.

A high temperature Viscotek Corporation viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, $[\eta]$, at each point in the chromatogram is calculated from the following equation:

$$\eta_s = c[\eta] + 0.3(c[\eta])^2$$

where c is concentration and was determined from the DRI output.

The branching index ($g'_{vis}$) is calculated using the output of the SEC-DRI-LS-VIS method as follows. The average intrinsic viscosity, $[\eta]_{avg}$, of the sample is calculated by:

$$[\eta]_{avg} = \frac{\Sigma c_i [\eta]_i}{\Sigma c_i}$$

where the summations are over the chromatographic slices, i, between the integration limits. The branching index $g'_{vis}$, which is also referred to simply as g' is defined as:

$$g'vis = \frac{[\eta]_{avg}}{kM_v^\alpha}$$

where, for purpose of this invention and claims thereto, α=0.695 and k=0.000579 for linear ethylene polymers, α=0.705 k=0.000262 for linear propylene polymers, and α=0.695 and k=0.000181 for linear butene polymers. $M_v$ is the viscosity-average molecular weight based on molecular weights determined by LS analysis.

The term "g" also called a "g value" is defined to be $Rg^2_{pm}/Rg^2_{ls}$, where $Rg_{pm}$ is the radius of gyration for the polymacromer, $Rg^2_{ls}$ is the radius of gyration for the linear standard, and $Rg_{ls} = K_s M^{0.58}$ where $K_s$ is the power law coefficient (0.023 for linear polyethylene, 0.0171 for linear polypropylene, and 0.0145 for linear polybutene), and M is the molecular weight as described above, $Rg_{pm} = K_T M^{\alpha_s}$. $\alpha_s$ is the size coefficient for the polymacromer, $K_T$ is the power law coefficient for the polymacromer. See Macromolecules, 2001, 34, 6812-6820, for guidance on selecting a linear standard having the molecular weight and comonomer content, and determining K coefficients and α exponents.

Rubber Component

The TPVs described herein comprise a rubber component. The "rubber component" can be any material that is considered by persons skilled in the art to be a "rubber", preferably a crosslinkable rubber (i.e., prior to vulcanization) or crosslinked rubber (i.e., after vulcanization). The rubber component may comprise one rubber or may comprise blends of two or more rubbers, where the rubbers are different in composition or are the same in composition but have different properties.

Non-limiting examples of useful rubbers include olefin-containing rubbers, butyl rubber, natural rubber, styrene-butadiene copolymer rubber, butadiene rubber, acrylonitrile rubber, halogenated rubbers such as brominated and chlorinated isobutylene-isoprene copolymer rubber, butadiene-styrene-vinyl pyridine rubber, urethane rubber, polyisoprene rubber, epichlorohydrin terpolymer rubber, polychloroprene rubber, and mixtures thereof. In preferred embodiments, the rubber is an olefin-containing rubber, such as an ethylene-α-olefin copolymer rubber, such as an ethylene-α-olefin-diene rubber.

The rubber may be an ethylene-α-olefin copolymer rubber comprising an α-olefin having 3 to 8 carbon atoms, such as, for example propylene. The ethylene-α-olefin rubber may contain at least 50 wt %, or at least 55 wt %, or at least 60 wt % of ethylene-derived units based on the weight of the ethylene-α-olefin rubber, with the balance of the units being α-olefin derived.

In preferred embodiments, the rubber component comprises an ethylene-α-olefin-diene rubber. The ethylene-α-olefin-diene rubber may comprise an α-olefin having 3 to 8 carbon atoms. In preferred embodiments the α-olefin is propylene, and the rubber is an ethylene-propylene-diene rubber ("EPDM"). Preferably the diene in the ethylene-α-olefin-diene rubber is a nonconjugated diene. Suitable nonconjugated dienes include 5-ethylidene-2-norbornene ("ENB"); 1,4-hexadiene; 5-methylene-2-norbornene; 1,6-octadiene; 5-methyl-1,4-hexadiene; 3,7-dimethyl-1,6-octadiene; 1,3-cyclopentadiene; 1,4-cyclohexadiene; dicyclopentadiene ("DCPD"); 5-vinyl-2-norbornene ("VNB"); divinyl benzene; and combinations thereof. In some embodiments, the ethylene-α-olefin-diene rubber comprises diene-derived units derived from ENB, VNB, or combinations thereof. In preferred embodiments, the ethylene-α-olefin diene rubber consists essentially of, or consists only of, units derived from ethylene, propylene, and ENB.

The ethylene-α-olefin-diene rubber may contain at least 50 wt %, or at least 55 wt %, or at least 60 wt % ethylene-derived units, based in the weight of the ethylene-α-olefin-diene rubber. In some embodiments, the ethylene-α-olefin-diene rubber contains from 50 to 90 wt % ethylene-derived units, or from 50 to 85 wt %, or from 55 to 80 wt %, or from 55 to 75 wt %, or from 60 to 70 wt % ethylene-derived units, based on the weight of the ethylene-α-olefin-diene rubber, where desirable ranges may include ranges from any lower limit to any upper limit. The amount of ethylene-derived units in the copolymer may be determined according to ASTM D3900. In the ethylene-α-olefin-diene rubber, the diene-derived units may be present in an amount of at least 0.1 wt %, or at least 1 wt %, or at least 2 wt %, or at least 3 wt %, or at least 4 wt %, based on the weight of the ethylene-α-olefin-diene rubber. In some embodiments, the ethylene-α-olefin-diene rubber may contain from about 0.1 to about 10 wt %, or from about 1 to about 9 wt %, or from about 2 to about 8 wt %, or from about 3 to about 7 wt %, or from about 4 to about 6 wt % diene-derived units, based on the weight of the ethylene-α-olefin-diene rubber, where desirable ranges may include ranges from any lower limit to any upper limit. The wt % of diene-derived units may be determined according to ASTM D-6047. The balance of the ethylene-α-olefin-diene rubber will generally be made up of units derived from α-olefin, such as propylene. Accordingly, the ethylene-α-olefin-diene rubber may contain at least 10 wt %, or at least 15 wt %, or at least 20 wt %, or at least 25 wt %, or at least 30 wt % α-olefin derived units, based on the weight of the ethylene-α-olefin-diene rubber. In some embodiments, the ethylene-α-olefin diene rubber may contain from about 10 to about 50 wt %, or from about 15 to about 45 wt %, or from about 20 to about 40 wt %, or from about 25 to about 35 wt % α-olefin derived units, based on the weight of the ethylene-α-olefin-diene rubber, where desirable ranges may include ranges from any lower limit to any upper limit.

The ethylene-α-olefin rubber or the ethylene-α-olefin-diene rubber may have a weight average molecular weight (Mw) that is greater than 100,000, or greater than 200,000, or greater than 400,000, or greater than 600,000 daltons. The Mw of the ethylene-α-olefin rubber or the ethylene-α-olefin-diene rubber may be less than 1,200,000, or less than 1,000,000, or less than 900,000, or less than 800,000 daltons. Useful ethylene-α-olefin rubbers and ethylene-α-olefin-diene rubbers may have a number average molecular weight (Mn) that is greater than 20,000, or greater than 60,000, or greater than 100,000, or greater than 150,000 dalton. The Mn of the ethylene-α-olefin rubber or the ethylene-α-olefin-diene rubber may be less than 500,000, or less than 400,000, or less than 300,000, or less than 250,000 daltons. Techniques for determining the molecular weight ($M_n$, $M_w$, and $M_z$) and molecular weight distribution (MWD) may be found in U.S. Pat. No. 4,540,753, which is incorporated by reference herein, and references cited therein and in Macromolecules, 1988, volume 21, p. 3360 by Ver Strate et al., which is also herein incorporated by reference, and references cited therein.

The ethylene-α-olefin rubber or the ethylene-α-olefin-diene rubber may also be characterized by having a Mooney viscosity (ML(1+4) at 125° C.) per ASTM D-1646, of from about 10 to about 250, or from about 20 to about 100, or from about 30 to about 75, or from about 40 to about 60, where desirable ranges may include ranges from any lower limit to any upper limit. As used herein, Mooney viscosity is reported using the format: Rotor ([pre-heat time in minutes]+[shearing time in minutes] @ measurement temperature in ° C.), such that ML (1+4@125° C.) indicates a Mooney viscosity determined using the ML or large rotor according to ASTM D1646-99, for a pre-heat time of 1 minute and a shear time of 4 minutes, at a temperature of 125° C. In some embodiments, the ethylene-α-olefin rubber or the ethylene-α-olefin-diene rubber is oil extended and the Mooney viscosity of the oil-extended rubber is from about 10 to about 250, or from about 20 to about 100, or from about 30 to about 75, or from about 40 to about 60, where desirable ranges may include ranges from any lower limit to any upper limit.

The ethylene-α-olefin rubber or the ethylene-α-olefin-diene rubber may be characterized by having an intrinsic viscosity, as measured in decalin at 135° C. per ASTM D-1601, of from about 1 to about 8 dl/g, or from about 3 to about 7 dl/g, or from about 4 to about 6.5 dl/g, where desirable ranges may include ranges from any lower limit to any upper limit.

The ethylene-α-olefin rubber or the ethylene-α-olefin-diene rubber may be characterized by a glass transition temperature ($T_g$), as determined by Differential Scanning calorimetry (DSC) according to ASTM E-1356, that is less than −20° C., or less than −30° C., or less than −50° C., or from about −20 to about −60° C.

The ethylene-α-olefin and the ethylene-α-olefin-diene rubbers described herein may be manufactured or synthesized by using a variety of techniques. For example, these copolymers can be synthesized by employing solution, slurry, or gas phase polymerization techniques that employ various catalyst systems. Exemplary catalysts include Ziegler-Natta catalyst systems such as those including vanadium catalysts, and single-site catalysts including constrained geometry catalysts, or metallocene catalysts. Useful ethylene-α-olefin rubbers and ethylene-α-olefin-diene rubbers include some grades of rubbers commercially available under the tradenames Vistalon™ (ExxonMobil Chemical Co.; Houston, Tex.), Keltan™ (DSM Copolymers), Nordel™ IP (Dow), Nordel™ MG (Dow), Royalene™ (Lion Copolymer), and Buna™ (Lanxess).

The rubber component may be present in the TPV in an amount of from a low of about 7 wt %, or 10 wt %, or 12 wt %, or 15 wt %, or 20 wt %, or 25 wt %, or 27 wt %, to a high of about 30 wt %, 35 wt %, 40 wt %, or 45 wt % based on total weight of the TPV composition, where desirable ranges may include ranges from any lower limit to any upper limit.

Thermoplastic Component

The TPVs described herein comprise a thermoplastic component that comprises a broad molecular weight distribution polypropylene ("BMWDPP"). In some embodiments, the thermoplastic component may further comprise an additional thermoplastic resin in addition to the BMWDPP.

The thermoplastic component may be present in the TPV composition in an amount of from a low of 5 wt %, or 8 wt %, or 10 wt %, or 15 wt %, or 20 wt % to a high of about 30 wt %, or 35 wt %, or 40 wt %, or 45 wt %, or 50 wt %, or 55 wt %, based on total weight of the TPV composition, where desirable ranges may include ranges from any lower limit to any upper limit.

The TPV may contain the BMWDPP in an amount of from a low of about 3 wt %, or 5 wt %, or 7 wt %, or 10 wt %, or 12 wt %, or 15 wt %, or 20 wt %, or 30 wt % to a high of about 40 wt %, or 45 wt %, or 50 wt %, or 55 wt %, or 60 wt %, based on the weight of the TPV, where desirable ranges may include ranges from any lower limit to any upper limit.

The TPV may contain the BMWDPP in an amount of from a low of about 60 wt %, or 70 wt %, or 75 wt %, or 80 wt %, or 81 wt %, or 82 wt %, or 83 wt %, or 84 wt %, or 85 wt %, to a high of about 90 wt %, or 92 wt %, or 93 wt %, or 94 wt %, or 95 wt %, or 96 wt %, or 97 wt %, or 98 wt %, or 99 wt %, or 100%, based on the weight of the thermoplastic component, where desirable ranges may include ranges from any lower limit to any upper limit.

Broad Molecular Weight Distribution Polypropylene

The thermoplastic component of the TPVs described herein comprises one or more broad molecular weight distribution polypropylene ("BMWDPP") resins. The BMWDPP comprises at least 75 mol %, or at least 80 mol %, or at least 90 mol %, or at least 95 mol %, or at least 99 mol %, or at least 100 mol % propylene-derived units. In any embodiment, the BMWDPP may comprise at least 75 wt % propylene, or at least 80 wt %, or at least 85 wt %, at least 90 wt %, at least 95 wt %, at least 99 wt %, or 100 wt % propylene-derived units. The BMWDPP may comprise from 0 to 10 mol %, or from 0.1 to 10 mol %, of a comonomer, selected from selected from the group consisting of ethylene and $C_4$ to $C_{20}$ olefins. In any embodiment, the alpha olefin may include ethylene, 1-butene, 4-methyl-1-pentene, 1-octene, or a combination thereof. In some embodiments, the BMWDPP is a propylene homopolymer.

The BMWDPP resin has a melt strength of at least 20 cN determined using an extensional rheometer at 190° C. For example, the BMWDPP may have a melt strength of at least 35 cN, at least 40 cN, at least 45 cN, at least 50 cN, at least 55 cN, at least 60 cN, at least 65 cN, at least 70 cN, at least 75 cN, or at least 80 cN. In some embodiments, the BMWDPP has a melt strength of from 50 cN to 200 cN, or from 60 cN to 150 cN, or from 70 cN to 200 cN, or any combination thereof. For purposes herein, the melt strength of a polymer at a particular temperature, e.g., 190° C., is determined with a Gottfert Rheotens Melt Strength Apparatus (e.g., Gottfert Rheotens 71.97). The measurement is accomplished by grasping the extrudate from a capillary rheometer (e.g., a Gottfert Rheograph 2002 capillary rheometer), or from an extruder equipped with a capillary die, after the extrudate has been extruded 100 mm using variable speed gears and increasing the gear speed at a constant acceleration (12 mm/s², starting from an initial, zero-force calibration velocity of 10 mm/s) until the molten polymer strand breaks. The force in the strand is measured with a balance beam in conjunction with a linear variable displacement transducer. The force required to extend and then break the extrudate is defined as the melt strength. The force is measured in centinewtons (cN). A typical plot of force vs. wheel velocity is known in the art to include a resonate immediately before the strand breaks. In such cases, the plateau force is approximated by the midline between the oscillations.

The BMWDPP can have an MWD (Mw/Mn) of greater than 4, or greater than 4.5, or greater than 5, or greater than 5.5. For example, the BMWDPP may have a MWD of from 4 to 20, or from 4.5 to 15, or from 5 to 10, or any combination thereof.

The BMWDPP may have a branching index (g') of at least 0.95, or at least 0.99.

The BMWDPP may have a stiffness of greater than 2000 MPa, or greater than 2100 MPa, or 290 kpsi (2000 MPa) to 360 kpsi (2500 MPa) determined according to ASTM D790A on nucleated samples with 0.1% sodium benzoate.

The BMWDPP may have a viscosity ratio of greater than or equal to 35, or 40, or 45, or from 35 to 80 determined at an angular frequency ratio of 0.01 and at an angular frequency ratio of 100 rad/s (at an angular frequency ratio of 0.01 to 100 rad/s) at a fixed strain of 10% at 190° C.

The BMWDPP may have a viscosity ratio of greater than or equal to 17, or 18, or 19, for example, of from 17 to 35, or from 18 to 30, or from or from 19 to 25, as determined at an angular frequency ratio of 0.1 and at an angular frequency ratio of 100 rad/s (at an angular frequency ratio of 0.1 to 100 rad/s) at a fixed strain of 10% at 190° C.

The BMWDPP may have a MFR (ASTM D1238 Condition L at 230° C. and 2.16 kg) of from less than 5, or less than 4, or less than 3 g/10 min. The BMWDPP may have a MFR of greater than 1, or greater than 1.5, or greater than 2 g/10 min. In some embodiments, the BMWDPP has a MFR in the range of 1 to 10 g/10 min, or from 1.5 to 5 g/10 min, or from 2 to 4 g/10 min.

The BMWDPP may have a high load MFR (HLMFR) (ASTM D1338 at 230° C.; 21.6 kg) of greater than 150 g/10 min, or greater than 200 g/10 min, or greater than 250 g/10 min, or greater than 275 g/10 min, or greater than 300 g/10 min, or greater than 325 g/10 min.

The BMWDPP may have a zero shear viscosity of greater than 28,000 Pa·s, or greater than 29,000 Pa·s, or greater than 30,000 Pa·s, or greater than 31,000 Pa·s, or greater than 33,000 Pa·s, or greater than 35,000 Pa·s.

In any embodiment the BMWDPP resin may be free of functionalized polypropylene or comprises less than 5 weight percent of functional groups selected from hydroxide, aryls, substituted aryls, halogens, alkoxys, carboxylates, esters, acrylates, and carboxyl, based upon the weight of the polypropylene resin, and wherein the number of carbons of the polypropylene resin involved in olefinic bonds is less than 5% of the total number of carbon atoms in the resin. In any embodiment, the resin may be free of post-reactor grafted polypropylene or comprises less than 5 percent by weight of post-reactor grafted polypropylene.

The BMWDPP resin may have a heat distortion temperature of greater than or equal to 100° C., determined according to ASTM D648 using a load of 0.45 MPa (66 psi).

The BMWDPP resin may have an isopentad percentage of greater than 90%, or greater than 95%, or greater than 99%.

The BMWDPP may have a Mn of greater than 55,000, or greater than 60,000, or greater than 65,000, or greater than 70,000, or greater than 80,000, or greater than 85,000 daltons. The BMWDPP may have a Mn of less than 150,000, or less than 145,000, or less than 140,000, or less than 135,000, or less than 130,000, or less than 130,000, or less than 120,000, or less than 115,000, or less than 110,000, or less than 105,000, or less than 100,000 daltons.

The BMWDPP may have a Mw of greater than 380,000, or greater than 385,000, or greater than 390,000, or greater than 395,000, or greater than 400,000, or greater than 405,000, or greater than 410,000, or greater than 415,000, or greater than 420,000, or greater than 430,000, or greater than 440,000 daltons. The BMWDPP may have a Mw of less than 550,000, or less than 525,000, or less than 515,000, or less than 510,000, or less than 500,000, or less than 495,000, or less than 490,000, or less than 485,000, or less than 480,000, or less than 475,000, or less than 470,000, or less than 465,000, or less than 460,000 daltons.

The BMWDPP may have a Mz of greater than 1,000,000, or greater than 1,050,000, or greater than 1,100,000, or greater than 1,150,000, or greater than 1,200,000, or greater than 1,250,000, or greater than 1,275,000, or greater than 1,285,000, or greater than 1,295,000, or greater than 1,300,000, or greater than 1,305,000, or greater than 1,310,000, or greater than 1,315,000, or greater than 1,320,000, or greater than 1,325,000, or greater than 1,330,000, or greater than 1,335,000, or greater than 1,340,000, or greater than 1,345,000, or greater than 1,350,000, or greater than 1,400,000 daltons. The BMWDPP may have a Mz of less than 2,000,000, or less than 1,950,000, or less than 1,900,000, or less than 1,850,000, or less than 1,800,000, or less than 1,750,000, or less than 1,700,000, or less than 1,650,000, or less than 1,640,000, or less than 1,630,000, or less than 1,620,000, or less than 1,610,000, or less than 1,600,000, or less than 1,500,000 daltons.

The BMWDPP resin may be produced by contacting propylene monomers at a temperature and a pressure in the presence of catalyst system comprising a Ziegler-Natta catalyst comprising a non-aromatic internal electron donor and two or more external electron donors. For example, the BMWDPP may be produced using Ziegler-Natta catalysts that include solid titanium supported catalyst systems as described in PCT Publication Nos. WO 2014/070384; WO 2014/070385; and WO2014/070386, the disclosures of which are incorporated herein by reference.

In some embodiments, the Ziegler-Natta catalyst can be obtained by: (1) suspending a dialkoxy magnesium compound in an aromatic hydrocarbon that is liquid at ambient temperatures; (2) contacting the dialkoxy magnesium hydrocarbon composition with a titanium halide and with a diester of an aromatic dicarboxylic acid; and (3) contacting the resulting functionalized dialkoxy magnesium-hydrocarbon composition of step (2) with additional titanium halide. For example, the catalyst system may be a solid titanium catalyst component comprising magnesium, titanium, halogen, a non-aromatic internal electron donor, and two or more external electron donors.

Examples of the titanium compound used in the preparation of the solid titanium catalyst component include tetravalent titanium compounds having the formula:

$$Ti(OR_n)X_{4-n}$$

wherein R is a hydrocarbyl radical, X is a halogen atom, and n is from 0 to 4. Suitable titanium compounds for use herein include: titanium tetra-halides such as $TiCl_4$, $TiBr_4$, and/or $TiI_4$; alkoxy titanium trihalides including $Ti(OCH_3)Cl_3$, $Ti(OC_2H_5)Cl_3$, $Ti(O\ n-C_4H_9)Cl_3$, $Ti(OC_2H_5)Br_3$, and/or $Ti(O\ iso-C_4H_9)Br_3$; dialkoxytitanium dihalides including $Ti(OCH_3)_2Cl_2$, $Ti(OC_2H_5)_2Cl_2$, $Ti(O\ n-C_4H_9)_2Cl_2$ and/or $Ti(OC_2H_5)_2Br_2$; trialkoxytitanium monohalides including $Ti(OCH_3)_3Cl$, $Ti(OC_2H_5)_3Cl$, $Ti(O\ n-C_4H_9)_3Cl$ and/or $Ti(OC_2H_5)_3Br$; and/or tetraalkoxy titaniums including $Ti(OCH_3)_4$, $Ti(OC_2H_5)_4$, and/or $Ti(O\ n-C_4H_9)_4$.

The magnesium compound to be used in the preparation of the solid titanium catalyst component may include a magnesium compound having reducibility and/or a magnesium compound having no reducibility. Suitable magnesium compounds having reducibility may, for example, be magnesium compounds having a magnesium-carbon bond or a magnesium-hydrogen bond. Suitable examples of such reducible magnesium compounds include dimethyl magnesium, diethyl magnesium, dipropyl magnesium, dibutyl magnesium, diamyl magnesium, dihexyl magnesium, didecyl magnesium, magnesium ethyl chloride, magnesium propyl chloride, magnesium butyl chloride, magnesium hexyl chloride, magnesium amyl chloride, butyl ethoxy magnesium, ethyl butyl magnesium, and/or butyl magnesium halides. These magnesium compounds may be used singly or they may form complexes with the organoaluminum co-catalyst as described herein. These magnesium compounds may be a liquid or a solid. Suitable examples of the magnesium compounds having no reducibility include magnesium halides such as magnesium chloride, magnesium bromide, magnesium iodide, and magnesium fluoride; alkoxy magnesium halides, such as magnesium methoxy chloride, magnesium ethoxy chloride, magnesium isopropoxy chloride, magnesium phenoxy chloride, and magnesium methylphenoxy chloride; alkoxy magnesiums, such as ethoxy magnesium, isopropoxy magnesium, butoxy magnesium, n-octoxy magnesium, and 2-ethylhexoxy magnesium; aryloxy magnesiums such as phenoxy magnesium and dimethylphenoxy magnesium; and/or magnesium carboxylates, such as magnesium laurate and magnesium stearate.

The supported Ziegler-Natta catalyst may be used in combination with a co-catalyst. For example, compounds containing at least one aluminum-carbon bond in the molecule may be utilized as the co-catalysts, also referred to herein as an organoaluminum co-catalyst. Suitable examples of the organoaluminum compounds include trialkyl aluminums such as trimethyl aluminum, triethyl aluminum and tributyl aluminum; trialkenyl aluminums such as triisoprenyl aluminum; dialkyl aluminum alkoxides such as diethyl aluminum ethoxide and dibutyl aluminum ethoxide; alkyl aluminum sesquialkoxides such as ethyl aluminum sesquiethoxide and butyl aluminum sesqui-butoxide; partially halogenated alkyl aluminums, for example, alkyl aluminum dihalides such as ethyl aluminum dichloride, propyl aluminum dichloride and butyl aluminum dibromide; partially hydrogenated alkyl aluminums, for example, alkyl aluminum dihydrides such as ethyl aluminum dihydride and propyl aluminum dihydride; and partially alkoxylated and halogenated alkyl aluminums such as ethyl aluminum ethoxychloride, butyl aluminum butoxychloride, and ethyl aluminum ethoxybromide. In some embodiments, the co-catalyst may be an organoaluminum compound that is halogen free. Suitable halogen free organoaluminum compounds are, in particular, branched unsubstituted alkylaluminum compounds of the formula $AlR_3$, where R denotes an alkyl radical having 1 to 10 carbon atoms, such as for example, trimethylaluminum, triethylaluminum, triisobutylaluminum and tridiisobutylaluminum. Additional compounds that are suitable for use as a co-catalyst are readily available and amply disclosed in the prior art including U.S. Pat. No. 4,990,477. In any embodiment, the organoaluminum Ziegler-Natta co-catalyst may be trimethyl aluminum, triethylaluminum (TEAL), or a combination thereof.

An internal electron donor may be used in the formation reaction of the catalyst as the transition metal halide is reacted with the metal hydride or metal alkyl. Examples of suitable internal electron donors include amines, amides, ethers, esters, esters, ketones, nitriles, phosphines, stilbenes, arsines, phosphoramides, thioethers, thioesters, aldehydes, alcoholates, and salts of organic acids. In any embodiment, the internal donor may be non-aromatic. In any embodiment, the non-aromatic internal electron donor may comprise an aliphatic amine, amide, ester, ether, ketone, nitrile, phosphine, phosphoramide, thioethers, thioester, aldehyde, alcoholate, carboxylic acid, or a combination thereof. In any embodiment, the internal donor may be a monosubstituted non-aromatic succinate compound, and may be selected from diethyl 2,3-diisopropylsuccinate, diisobutyl 2,3-diisopropylsuccinate, di-n-butyl 2,3-diisopropylsuccinate, diethyl 2,3-dicyclohexyl-2-methylsuccinate, diisobutyl 2,3-dicyclohexyl-2-methylsuccinate, diisobutyl 2,2-dimethylsuccinate, diethyl 2,2-dimethylsuccinate, diethyl 2-ethyl-2-methylsuccinate, diisobutyl 2-ethyl-2-methylsuccinate, diethyl 2-(cyclohexylmethyl)-3-ethyl-3-methylsuccinate, diisobutyl 2-(cyclohexylmethyl)-3-ethyl-3-methylsuccinate, and combinations thereof.

In any embodiment, the non-aromatic internal electron donor may comprise an aliphatic amine, amide, ester, ether, ketone, nitrile, phosphine, phosphoramide, thioether, thioester, aldehyde, alcoholate, carboxylic acid, or a combination thereof, or a $C_1$ to $C_{20}$ diester of a substituted or unsubstituted $C_2$ to $C_{10}$ dicarboxylic acid, or a succinate according to the formula:

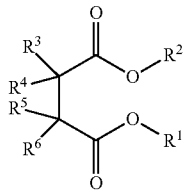

wherein $R^1$ and $R^2$ are, independently, $C_1$ to $C_{20}$ linear or branched alkyl, alkenyl, or cycloalkyl hydrocarbyl radicals; $R^3$ to $R^6$ are, independently, hydrogen, halogen, or $C_1$ to $C_{20}$ linear or branched alkyl, alkenyl, or cycloalkyl hydrocarbyl radicals, wherein the $R^3$ to $R^6$ radicals are not joined together, or wherein at least two of the $R^3$ to $R^6$ radicals are joined to form a cyclic divalent radical, or a combination thereof.

In conjunction with an internal donor, two or more external electron donors may also be used. External electron donors include, but are not limited to, organic silicon compounds, e.g., tetraethoxysilane (TEOS), methylcyclohexyldimethoxysilane (MCMS), propyltriethoxysilane (PTES) and dicyclopentydimethoxysilane (DCPMS). Internal and external-type electron donors are described, for example, in U.S. Pat. No. 4,535,068. The use of organic silicon compounds as external electron donors is described, for example, in U.S. Pat. Nos. 4,218,339; 4,395,360; 4,328,122; and 4,473,660. The external electron donors act to control stereoregularity, which affects the amount of isotactic versus atactic polymers produced in a given system. The more stereoregular isotactic polymer is more crystalline, which leads to a material with a higher flexural modulus. Highly crystalline, isotactic polymers also display lower MFRs, as a consequence of a reduced hydrogen response during polymerization. The stereoregulating capability and hydrogen response of a given external electron donor are directly and inversely related. The DCPMS donor has a substantially lower hydrogen response than the PTES donor, but produces a significantly higher level of stereoregularity than PTES.

The external electron donors to be used in the preparation of the electron donor catalyst component may be those electron donors which are used in preparing the solid titanium catalyst component. In any embodiment, each of the external electron donors (A) and (B) may comprise organic silicon compounds. For example, the first external electron donor may be an organosilicon compound, and may have the formula $R^1_2Si(OR^2)_2$, wherein each $R^1$ is independently a hydrocarbyl radical comprising from 1 to 10 carbon atoms in which the carbon adjacent to the Si is a secondary or a tertiary carbon atom, and wherein each $R^2$ is independently a hydrocarbyl radical comprising from 1 to 10 carbon atoms; and the second external electron donor has the formula $R^3_nSi(OR^4)_{4-n}$, wherein each $R^3$ and $R^4$ are independently a hydrocarbyl radical comprising from 1 to 10 carbon atoms, wherein n is 1, 2, or 3; and wherein the second external electron donor is different than the first external electron donor.

In any embodiment, the first external electron donor and the second external electron donor may be selected from the group consisting of tetraethoxysilane, methylcyclohexyldimethoxysilane, propyltriethoxysilane, dicyclopentydimethoxysilane, and combinations thereof. In any embodiment, the Ziegler-Natta catalyst system may comprise 2.5 mol % to less than 50 mol % of the first external electron donor and greater than 50 mol % of a second external electron donor based on total mol % of external electron donors. In any embodiment, the first electron donor may comprise, consist of, or consist essentially of dicyclopentyldimethoxysilane (DCPMS) and the second external electron donor may comprise, consist of, or consist essentially of propyltriethoxysilane (PTES).

In any embodiment, a relationship between the first external electron donor and the second external electron donor may be defined by the equation:

$$1.2 \leq \log[\text{MFR}(B)/\text{MFR}(A)] \leq 1.4$$

wherein MFR(A) is a first melt flow rate of a homopolymer formed by polymerizing propylene monomers in the presence of the Ziegler-Natta catalyst and the first external electron donor, and wherein MFR(B) is a second melt flow rate of a homopolymer formed by polymerizing propylene monomers in the presence of the Ziegler-Natta catalyst and the second external electron donor, and wherein the MFR(A) is lower than the MFR(B).

The polymerization process may include contacting propylene with the catalyst system under polymerization conditions. In any embodiment, the polymerization process may include a preliminary polymerization step. In any embodiment, the preliminary polymerization may include utilizing the Ziegler-Natta catalyst system comprising the non-aromatic internal electron donor in combination with at least a portion of the organoaluminum co-catalyst wherein at least a portion of the external electron donors are present wherein the catalyst system is utilized in a higher concentration than utilized in the subsequent "main" polymerization process.

In some embodiments, a method for making a BMWDPP resin may comprise contacting propylene monomers at a temperature and a pressure in the presence of catalyst system to produce a propylene resin comprising at least 50 mol % propylene, wherein the catalyst system comprises:

a Ziegler-Natta catalyst comprising a non-aromatic internal electron donor;

a first external electron donor having the formula $R^1_2Si(OR^2)_2$, wherein each $R^1$ is independently a hydrocarbyl radical comprising from 1 to 10 carbon atoms in which the carbon adjacent to the Si is a secondary or a tertiary carbon atom, and wherein each $R^2$ is independently a hydrocarbyl radical comprising from 1 to 10 carbon atoms; and a second external electron donor having the formula $R^3_nSi(OR^4)_{4-n}$, wherein each $R^3$ and $R^4$ are independently a hydrocarbyl radical comprising from 1 to 10 carbon atoms, n is 1, 2, or 3; and the second external electron donor is different than the first external electron donor.

The polymerization process may be carried out in the gaseous phase, the liquid phase, bulk phase, slurry phase, or any combination thereof. In preferred embodiments, polymerization may be carried out by slurry polymerization wherein the inert hydrocarbon may be used as a reaction solvent, or an olefin liquid under the reaction conditions may be used as the solvent.

In any embodiment, the titanium catalyst may be present in the reactor at 0.005 to 0.5 millimole, preferably 0.01 to 0.5 millimole, based on Ti moles per liter of the reaction zone. In any embodiment, the organoaluminum co-catalyst may be present in an amount sufficient to produce 1 to 2,000 moles, or 5 to 500 moles of aluminum per mole of the titanium atom in the catalyst system. In any embodiment, the internal electron donor may be present at 0.2 to 5.0, or 0.5 to 2.0 per mole of Ti.

In any embodiment, the total amount of the external electron donors may be 0.001 to 50 moles, or 0.01 to 20 moles, or 0.05 to 10 mole Si per mole of Ti present.

In any embodiment, the first external electron donor may be present in the catalyst system at from 2.5 to 50 mol %, or 2.5 to 10 mol % of the total amount of external electron donor present.

In any embodiment, polymerization conditions may include a polymerization temperature of 20 to 200° C., or 50 to 180° C., and a pressure from atmospheric pressure to 100 kg/cm$^2$, or from 2 to 50 kg/cm$^2$. The polymerization process according to the instant disclosure may be carried out batchwise, semicontinuously, or continuously. The polymerization may be carried out in two or more stages, using two or more reactors under different reaction conditions, utilizing different internal electron donors, different external electron donors, and/or different catalyst systems.

Additional Thermoplastic Resin

In addition to the BMWDPP the TPV may also contain one or more additional thermoplastic resins. The additional thermoplastic resin may be any material that is not a "rubber" and is not a "broad molecular weight distribution polypropylene" as described herein. For example, the thermoplastic resin may be a polymer or polymer blend considered by persons skilled in the art as being thermoplastic in nature, e.g., a polymer that softens when exposed to heat and returns to its original condition when cooled to room temperature.

Illustrative thermoplastic resins may be polyolefins prepared from mono-olefin monomers including, but are not limited to, monomers having 2 to 7 carbon atoms, such as ethylene, propylene, 1-butene, isobutylene, 1-pentene, 1-hexene, 1-octene, 3-methyl-1-pentene, 4-methyl-1-pentene, 5-methyl-1-hexene, mixtures thereof, and copolymers thereof. Preferably, the olefinic thermoplastic resin is unvulcanized or non cross-linked.

In preferred embodiments, the thermoplastic resin component further comprises a polypropylene that is not a BMWDPP. Preferably, the polypropylene used in the compositions described herein has a melting point above 110° C. and includes at least 90 wt % propylene-derived units. The polypropylene may also include isotactic, atactic or syndiotactic sequences, and preferably includes isotactic sequences. The polypropylene can either derive exclusively from propylene monomers (i.e., having only propylene-derived units) or comprises at least 90 wt %, or at least 93 wt %, or at least 95 wt %, or at least 97 wt %, or at least 98 wt %, or at least 99 wt % propylene-derived units with the remainder derived from olefins, such as ethylene, and/or $C_4$-$C_{10}$ α-olefins.

The thermoplastic resin may have a melting temperature of from at last 110° C., or at least 120° C., or at least 130° C., and may range from 110° C. to 170° C. or higher as measured by DSC.

The thermoplastic resin may have a melt flow rate "MFR" as measured by ASTM D1238 at 230° C. and 2.16 kg weight of from about 0.1 to 100 g/10 min. In preferred embodiments, the additional thermoplastic resin may be a fractional MFR, such a polypropylene having a fractional MFR of less than about 2 g/10 min, or less than about 1.5 g/10 min, or less than about 1 g/10 min. The TPV may also comprises a thermoplastic resin, such as a polypropylene, having a MFR of from a low of about 25, 26, 27, 28, 29, 30, 31, 32, or 33 g/10 min to a high of about 37, 38, 39, 40, 41, 42, 43, 44, or 45 g/10 min, where desirable ranges may include ranges from any lower limit to any upper limit. In some embodiments, the TPV may further comprise a thermoplastic resin, such as a polypropylene, having a MFR of from a low of about 5, 10, or 15 g/10 min to a high of about 20, 25, or 30 g/10 min, where desirable ranges may include ranges from any lower limit to any upper limit.

In some embodiments, the thermoplastic resin component may further comprise a propylene-based elastomer ("PBE") in addition to the BMWDPP. The PBE may comprise propylene and from about 5 to about 30 wt % of one or more comonomers selected from ethylene and/or $C_4$-$C_{12}$ α-olefins. The PBE may have a melting temperature (as determined by DSC) of less than about 110° C., less than about 100° C., less than about 90° C., less than about 80° C., less than about 70° C., less than about 65° C., less than about 60° C. The PBE may be characterized by an Hf of less than about 60 J/g, less than about 50 J/g, less than about 40 J/g, less than about 35 J/g, less than about 30 J/g, less than about 25 J/g, less than about 20 J/g, less than about 15 J/g. The PBE is preferably prepared using homogeneous conditions, such as a continuous solution polymerization process. Exemplary methods for the preparation of propylene-based polymer may be found in U.S. Pat. Nos. 6,881,800; 7,803,876; 8,013,069; and 8,026,323 and PCT Publications WO 2011/087729; WO 2011/087730; and WO 2011/087731.

In some embodiments, the thermoplastic phase of the TPV may further comprise a PBE that is a propylene-ethylene copolymer that has from about 9 wt % to about 15 wt % or from about 10 to about 12 wt %, ethylene-derived units and has at least three, or at least four, or at least five, or at least six, or at least seven, or all eight of the following properties (i) a Tm of from about 45 to about 65° C., or from about 50 to about 60° C., or from about 52 to about 58° C.; (ii) a Hf of from about 1.0 to about 25 J/g, from about 5.0 to about 20 J/g, from about 10 to 20 J/g, or from about 12 to about 18 J/g; (iii) a MI of from about 0.5 to about 3.0 g/10 min or from about 0.75 to about 2.0 g/10 min; (iv) a MFR of from about 0.5 to about 7.0 g/10 min, or from about 1.0 to about 6.0 g/10 min, or from about 2.0 to about 5.0 g/10 min; (v) a Mw of from about 240,000 to about 300,000 daltons, or from about 250,000 to about 280,000 daltons, or from about 260,000 to about 270,000 daltons; (vi) a Mn of from about 110,000 to about 140,000 daltons, from about 115,000 to about 135,000 daltons, or from about 120,000 to about 130,000 daltons; (vii) a Mz of from about 370,000 to about 420,000 daltons, from about 380,000 to about 410,000 daltons, or from about 385,000 to about 400,000 daltons; and/or (viii) a Mooney viscosity of from about 10 to about 40, or from about 15 to about 37, or from about 20 to about 35, or from about 25 to about 30.

Oil

The thermoplastic vulcanizates described herein further comprise oil, such as process oils and extender oils. As used herein, process oils are oils that are added directly to the vulcanization process, as compared to extender oils which are oils that are pre-blended with the rubber to extend the rubber prior to vulcanization.

The oils that may be used include hydrocarbon oils and plasticizers, such as organic esters and synthetic plasticizers. Many additive oils are derived from petroleum fractions, and have particular ASTM designations depending on whether they fall into the class of paraffinic, naphthenic, or aromatic oils. Other types of additive oils include alpha olefinic synthetic oils, such as liquid polybutylene. Additive oils other than petroleum based oils can also be used, such as oils derived from coal tar and pine tar, as well as synthetic oils, e.g., polyolefin materials.

Oil can be present in the TPV in an amounts of from about 5 to about 300 parts, or from 30 to 250 parts, or from 70 to 200 parts, by weight per 100 parts by weight of total weight of the rubber component and thermoplastic component, where desirable ranges may include ranges from any lower limit to any upper limit.

In some embodiments, oil may be present in the TPV in an amount of from a low of about 10 wt %, or 15 wt %, or 20 wt %, or 25 wt %, or 30 wt %, to a high of about 40 wt %, or 45 wt %, or 50 wt %, or 55 wt %, based on the total weight of the TPV, where desirable ranges may include ranges from any lower limit to any upper limit.

Alternatively, the quantity of oil used can be defined on the basis of the amount of oil introduced to the vulcanization process before the curative is introduced ("pre-cure oil"), oil introduced with the curative, and the amount of oil introduced to the vulcanization process after the curative is introduce ("post-cure oil"). The pre-cure oil may be oil that comes from oil-extended oil and/or process-oil that is directly introduced to the vulcanization process before the curative is added. For example, the amount of pre-cure oil may range from a low of about 55 wt %, or 56 wt %, or 57 wt %, or 58 wt %, or 59 wt %, or 60 wt % to a high of about 65 wt %, or 66 wt %, or 67 wt %, or 68 wt %, or 69 wt %, or 70 wt %, based on the total amount of oil in the TPV, where desirable ranges may include ranges from any lower limit to any upper limit. For example, the amount of post-cure oil may range from a low of about 25 wt %, 26 wt %, 27 wt %, 28 wt %, 29 wt %, 30 wt %, or 31 wt %, to a high of about 40 wt %, or 41 wt %, or 42 wt %, or 43 wt %, or 44 wt %, or 45 wt %, or 46 wt %, based on the total amount of oil in the TPV, where desirable ranges may include ranges from any lower limit to any upper limit. For example, the amount of oil introduced with the curative may range from a low of 1 wt %, or 2 wt %, or 3 wt %, or 4 wt %, to a high of about 7 wt %, or 8 wt %, or 9 wt %, or 10 wt %, based on the total amount of oil in the TPV, where desirable ranges may include ranges from any lower limit to any upper limit.

Vulcanizing Agent

Any vulcanizing agent that is capable of curing or crosslinking the rubber employed in preparing the TPV may be used. For example, the cure agent may include peroxides, phenolic resins, free radical curatives, hydrosilation curatives, or other curatives conventionally employed.

In preferred embodiments, the TPV is cured using a phenolic resin vulcanizing agent. The preferred phenolic resin curatives can be referred to as resole resins, which are made by the condensation of alkyl substituted phenols or unsubstituted phenols with aldehydes, preferably formaldehydes, in an alkaline medium or by condensation of bi-functional phenoldialcohols. The alkyl substituents of the alkyl substituted phenols may contain 1 to about 10 carbon atoms. Dimethylolphenols or phenolic resins, substituted in para-positions with alkyl groups containing 1 to about 10 carbon atoms are preferred. In some embodiments, a blend of octyl phenol and nonylphenol-formaldehyde resins are employed. The blend may include from 25 wt % to 40 wt % octyl phenol and from 75 wt % to 60 wt % nonylphenol, more preferably, the blend includes from 30 wt % to 35 wt % octyl phenol and from 70 wt % to 65 wt % nonylphenol. In some embodiments, the blend includes about 33 wt % octylphenol-formaldehyde and about 67 wt % nonylphenol formaldehyde resin, where each of the octylphenol and nonylphenol include methylol groups. This blend can be solubilized in paraffinic oil at about 30% solids.

Useful phenolic resins may be obtained under the tradenames SP-1044, SP-1045 (Schenectady International; Schenectady, N.Y.), which may be referred to as alkylphenol-formaldehyde resins (also available in a 30/70 weight percent paraffinic oil solution under the trade name HRJ-14247A). SP-1045 is believed to be an octylphenol-formaldehyde resin that contains methylol groups. The SP-1044 and SP-1045 resins are believed to be essentially free of halogen substituents or residual halogen compounds. By "essentially free of halogen substituents," it is meant that the synthesis of the resin provides for a non-halogenated resin that may only contain trace amounts of halogen containing compounds.

The curative may be used in conjunction with a cure accelerator, a metal oxide, an acid scavenger, and/or polymer stabilizers. Useful cure accelerators include metal halides, such as stannous chloride, stannous chloride anhydride, stannous chloride dihydrate and ferric chloride. The cure accelerator may be used to increase the degree of vulcanization of the TPV, and in some embodiments may be added in an amount of less than 1 wt % based on the total weight of the TPV. In preferred embodiments, the cure accelerator comprises stannous chloride. In some embodiments, the cure accelerator is introduced into the vulcanization process as part of a masterbatch.

In some embodiments, metal oxides may be added to the vulcanization process. It is believed that the metal oxide can act as a scorch retarder in the vulcanization process. Useful metal oxides include zinc oxides having a mean particle diameter of about 0.05 to about 0.15 μm. Useful zinc oxide can be obtained commercially under the tradename Kadox™ 911 (Horsehead Corp.).

In some embodiments, the curative, such as a phenolic resin, is used in conjunction with an acid scavenger. The acid scavenger may be added downstream of the curative after the desired level of cure has been achieved. Useful acid scavengers include hydrotalcites. Both synthetic and natural hydrotalcites can be used. Exemplary natural hydrotalcite can be represented by the formula $Mg_6Al_2(OH)_{1-6}CO_3 \cdot 4H_2O$. Synthetic hydrotalcite compounds, which are believed to have the formula: $Mg_{4.3}Al_2(OH)_{12.6}CO_3 \cdot mH_2O$ or $Mg_{4.5}Al_2(OH)_{13}CO_{3.3} \cdot 5H_2O$, can be obtained under the tradenames DHT-4A™ or Kyowaad™ 1000 (Kyowa, Japan). Another commercial example is that available under the trade name Alcamizer™ (Kyowa).

The curative, such as a phenolic resin, may be introduced into the vulcanization process in a solution or as part of a dispersion. In preferred embodiments, the curative is introduced to the vulcanization process in an oil dispersion/solution, such as a curative-in-oil or a phenolic resin-in-oil, where the curative/resin is dispersed and/or dissolved in a process oil. The process oil used may be a mineral oil, such as an aromatic mineral oil, naphthenic mineral oil, paraffinic mineral oils, or combination thereof.

The vulcanizing agent can be present in an amount effective to produce the desired amount of cure within the rubber phase. In certain embodiments, the vulcanizing agent is present in an amount of from 0.01 phr to 50 phr, or from 0.05 phr to 40 phr, or from 0.1 phr to 30 phr, or from 0.5 phr to 25 phr, or from 1.0 phr to 20 phr, or from 1.5 phr to 15 phr, or from 2.0 phr to 10 phr.

In embodiments where a phenolic resin is used, the phenolic resin may be employed in an amount from about 0.1 to 10 parts by weight, or from about 2 to about 6 parts by weight, or from about 3 to about 5 parts by weight, or from about 4 to about 5 parts by weight per 100 parts by weight of rubber. A complementary amount of stannous chloride may include from about 0.5 to about 2.0 parts by weight, or from about 1.0 to about 1.5 parts by weight, or from about 1.2 to about 1.3 parts by weight per 100 parts by weight of rubber. In conjunction therewith, from about 0.1 to about 6.0 parts by weight, or from about 1.0 to about 5.0 parts by weight, or from about 2.0 to about 4.0 parts by weight of zinc oxide may be employed. In one or more embodiments, the rubber employed with the phenolic curatives includes diene units deriving from 5-ethylidene-2-norbornene.

Additives

The TPV may further comprise one or more additives. These additives may be present in addition to, or in place of the additives which may be present in the rubber and thermoplastic resin compositions used to make the TPV. Suitable additives include, but are not limited to, plasticizers, fillers, and processing aids.

The TPV composition may also include reinforcing and non-reinforcing fillers, antioxidants, stabilizers, antiblocking agents, anti-static agents, waxes, foaming agents, pigments, flame retardants and other processing aids known in the rubber compounding art. Fillers and extenders that can be utilized include conventional inorganics such as calcium carbonate, clays, silica, talc, titanium dioxide, carbon black, as well as organic and inorganic nanoscopic fillers. Fillers, such as carbon black, may be added as part of a masterbatch, and for example may be added in combination with a carrier such as polypropylene.

In one or more embodiments, the TPV includes at least about 5 wt %, 6 wt %, 7 wt %, 8 wt %, 9 wt %, or 10 wt % or of one or more fillers, such as calcium carbonate, clays, silica, talc, titanium dioxide, carbon black, and blends thereof, based on the weight of the TPV. In preferred embodiments, the TPV includes clay and/or carbon black in an amount ranging from a low of about 5 wt %, 6 wt %, 7 wt %, 8 wt %, 9 wt %, or 10 wt % to a high of about 15 wt %, 16 wt %, 17 wt %, 18 wt %, 19 wt %, or 20 wt %, based on the total weight of the TPV.

Methods for Making Thermoplastic Vulcanizate Compositions

Any process for making TPVs may be employed. In one or more embodiments, the individual materials and components, such as the one or more rubber components, thermoplastic resin components, additive oils, curatives, other additives, etc., may be blended by melt-mixing in any order in a mixer heated to above the melting temperature of the thermoplastic resin component.

The one or more components, thermoplastic resin components, and curing agents can be added to a heated mixer as individual feed streams, as a tumbled blend, or as a masterbatch. The one or more thermoplastic resin components can be added before cure or divided in any proportions between before or after the addition of the curative. The additive oil, e.g. process oil, can be added during mastication before the addition of the curative, after the addition of the curative, or divided in any proportions between before and after the addition of the curative.

Preferably, the one or more curing agents are incorporated into the melt within a target range of melt temperature over a specified period of time (<120 seconds). The one or more curing agents can be added using any suitable technique, such as by injection as a solution in a compatible process oil, as a neat solid, as a neat melt, or as a masterbatch, for example.

One or more fillers or other additives can be introduced to the melt either before, during or after the addition of the curative. The additives, fillers or other compounds, which may interfere with the curing agents, should be added after curing reaches the desired level. Preferably, those additives are added to the melt as a slurry or paste in a compatible rubber process oil. Powder blends or masterbatches of these components can be prepared in a wax or polymer carrier to facilitate metering and mixing. A side feeder can also be used to add the one or more mineral fillers and other additives.

Any process for making TPVs can be employed, so long as the propylene copolymer is added prior to the dynamic vulcanization of the crosslinkable rubber. For example, the individual materials and components, such as the one or more rubber components, polyolefinic thermoplastic resin components, thermoplastic modifiers, including the propylene copolymer, curing agents, additive oils, and other additives, can be mixed at a temperature above the melting temperature of the thermoplastic components to form a melt. Illustrative mixing equipment include: extruders with kneaders or mixing elements with one or more mixing tips or flights, extruders with one or more screws, and extruders of co or counter rotating type. Suitable mixing equipment also includes Brabender™ mixers, Banbury™ mixers, Buss mixers and kneaders, and Farrell Continuous mixers, for example. One or more of those mixing equipment, including extruders, can be used in series.

The required mixing for discrete rubber phase morphology and properties can be developed through choice of screw design and screw speed. It is convenient to follow the progression of vulcanization (crosslinking) by monitoring melt temperature or mixing energy or mixing torque requirements during mixing. The mixing torque or mixing energy curve generally goes through a maximum after which the mixing can be continued to achieve the desirable cure level (state) and improve the fabricability for the blend. Following the cure and sufficient mixing of the melt, the melt blend can be processed to form an elastomeric structure using any one or more of the following techniques: milling, chopping, extrusion, pelletizing, injection molding, or any other desirable technique. Additional details for making a TPV may include those described in U.S. Pat. Nos. 4,594,390; 4,130,535; 4,311,628; and 6,042,260, as well as patent application publications US 2006/0293457 and WO 2004/009327.

End Use Applications

The TPV compositions described herein may be useful for making articles by extrusion, injection molding, blow molding, calendaring and compression molding techniques. Particularly, the TPV compositions herein may be useful for making a variety of articles such as molded corners, molded end caps, glass run channels, trunk seals, tailgate seals, cowl seals, gap fillers, glass encapsulation, cut line seals, door seals, hood-to-radiator seals, windshield seals, sunroof seals, roof line seals, rear window seals, rocker panels, sashes, and belt-line seals.

Thermoplastic Vulcanizate Compositions

In one or more embodiments, the TPV is cured to an extent such that the rubber is completely or fully cured. In some embodiments, the TPV is cured such that less than 5 wt %, or less than 4 wt %, or less than 3 wt % of the rubber is extractable by cyclohexane at 23° C. Alternatively, in one or more embodiments, the rubber has a degree of cure such that the crosslink density is preferably at least $4 \times 10^{-5}$, or at least $7 \times 10^{-5}$, or at least $10 \times 10^{-5}$ moles per milliliter of rubber. See also "Crosslink Densities and Phase Morphologies in Dynamically Vulcanized TPEs," by Ellul et al, RUBBER CHEMISTRY AND TECHNOLOGY, Vol. 68, pp. 573-584 (1995).

Despite the fact that the rubber may be fully cured, the TPV can be processed and reprocessed by conventional plastic processing techniques such as extrusion, injection molding, blow molding, and compression molding. The rubber within these TPVs can be in the form of finely-divided and well-dispersed particles of vulcanized or cured rubber within a continuous thermoplastic phase or matrix. The rubber particles can have an average diameter that is less than 50 µm, or less than 30 µm, or less than 10 µm, or less than 5 µm, and or less than 1 µm. In some embodiments, the rubber particles have an average diameter greater than 2 millimicrons, or greater than 5 millimicrons, or greater than 10 millimicrons. In certain embodiments, at least 50%, optionally at least 60%, and optionally at least 75% of the rubber particles have an average diameter of less than 5 µm, or less than 2 µm, or less than 1 µm.

As described herein, the TPV comprises (i) rubber, (ii) BMWDPP, (iii) oil, and (iv) additives and/or fillers. In some embodiments, the TPV may further comprise an additional thermoplastic resin. The ingredients of the TPV are mixed in the extrusion reactor such that the resulting TPV comprises a rubber phase that is dispersed and at least partially crosslinked or fully crosslinked within a continuous thermoplastic component that comprises the BMWDPP.

In some embodiments, the TPV may have a Shore A hardness of greater than 50, or greater than 55, or greater than 60, or greater than 65, or greater than 70, or greater than 75. In some embodiments, the TPV may have a Shore A hardness of less than 100, or less than 95, or less than 90, or less than 85, or less than 80.

TPVs made using the BMWDPPs described herein may have improved extruder processability and in some cases improved tensile properties relative to TPVs made using fractional polypropylene. For example, in some embodiments, the TPVs may beneficially exhibit an ultimate elongation of greater than 400%, or greater than 410%, or greater than 415%, or greater than 420%, or greater than 425%, or greater than 430%.

EXAMPLES

In order to provide a better understanding of the foregoing discussion, the following non-limiting examples are offered. Although the examples may be directed to specific embodiments, they are not to be viewed as limiting the invention in any specific respect. All parts, proportions, and percentages are by weight unless otherwise indicated.

The following materials were used in the Examples.

"V3666" was Vistalon™ 3666 EPDM rubber which is an ethylene-propylene-diene rubber that has 64.0 wt % ethylene content (ASTM D3900) and 4.5 wt % ENB diene content (ASTM D6047). V3666 is oil extended with 75 phr of oil and has an oil-extended Mooney Viscosity of 52 MU (ML 1+4, 125° C.; ASTM D1646). V3666 is commercially available from ExxonMobil Chemical Company.

"PP5341" was ExxonMobil™ PP5341 polypropylene which is a polypropylene homopolymer with the following typical properties: a density of 0.9 g/cc and a MFR of 0.83 g/10 min (ASTM D1238; 230° C. and 2.16 kg weight). PP5341 is commercially available from ExxonMobil Chemical Company, Houston, Tex.

"PPF180A" is a polypropylene homopolymer commercially available from Braskem. PPF180A has a MFR of 17 g/10 min (ASTM D-1238; 230° C. and 2.16 kg weight).

"PP556E" was Basell Moplen HP556E which is a polypropylene homopolymer. PP556E has a melt flow rate (230° C., 2.16 kg) of 0.8 g/10 min (ISO 1133), and a Vicat softening temperature of 153° C. (ISO 306, A50 (50° C./h 10 N)) and 93° C. (ISO 306, B50 (50° C./h, 50 N)).

"VM3020" was Vistamaxx™ 3020 propylene-based elastomer which is a random propylene-ethylene copolymer with an ethylene content of 11 wt %. VM3020 has a density of 0.874 g/cc (ASTM D1505), a melt index of 1.1 g/10 min (ASTM D1238; 190° C. and 2.16 kg weight), a MFR of 3 g/10 min (ASTM D1238; 230° C. and 2.16 kg weight), a Shore D hardness of 34 (ASTM D2240), and a Vicat softening temperature of 68.3° C. VM3020 is commercially available from ExxonMobil Chemical Company, Houston, Tex.

"Clay" was Icecap™ K Clay.

"$SnCl_2$ MB" was an anhydrous stannous chloride polypropylene masterbatch. The $SnCl_2$ MB contained 45 wt % stannous chloride and 55 wt % of polypropylene having an MFR of 0.8 g/10 min (ASTM D1238; 230° C. and 2.16 kg weight).

"Black MB" was a carbon black masterbatch that contained 57.75 wt % polypropylene having an MFR of 35 g/10 min (ASTM D1238; 230° C. and 2.16 kg weight), 41.1 wt % carbon black, 1 wt % Kenamide S, and 0.25 wt % primary antioxidant.

"RIO" was a phenolic resin-in-oil curative that contained 30 wt % phenolic resin and 70 wt % oil.

"Zinc Oxide" or "ZnO" was Kadox 911 zinc oxide.

"Oil #1" and "Oil #2" were Paralux 6001R Oil which is commercially available from Chevron Corporation.

Test Methods

Melt Flow Rate (MFR) was measured according to ASTM D1238, condition L, at 230° C. and 2.16 kg load.

High Load Melt Flow Rate (HLMFR) was measured according to ASTM D1238, condition L, at 230° C. and 21.6 kg load.

The complex viscosity was measured with an MCR501 (Anton Paar) parallel plate rheometer equipped with 25 mm parallel plates running RHEOPLUS V3.62. The viscosity was obtained at 230° C. in a frequency range from 100 to 0.1 Hz, with a gap of 1.9 mm and strain of 5%.

Zero shear viscosity (η0) was calculated from the complex viscosity by fitting the complex viscosity to a Carreau model as described on Page 86 of Rheology Principles, Measurement, and Applications by Christopher W. Macosko and published in 1994 by Wiley Scientific.

Viscosity ratio (η0.1/η100) is the result of the complex viscosity measured at 0.1 [Rad/sec] divided by the complex viscosity measured at 100 [Rad/sec].

The number-average molecular weight (Mn), weight-average molecular weight (Mw), and z-average molecular weight (Mz), were determined by using a High Temperature Gel Permeation Chromatography (GPC-3D) (Agilent PL-220), equipped with three in-line detectors, a differential refractive index detector (DRI), a light scattering (LS) detector, and a viscometer. The Mw/Mn was calculated from the values determined from the GPC-3D. Experimental details, including detector calibration, are described in: T. Sun, P. Brant, R. R. Chance, and W. W. Graessley, Macromolecules, Volume 34, Number 19, pp. 6812-6820, (2001) and references therein. Three Agilent PLgel 10 µm Mixed-B LS columns were used. The nominal flow rate was 0.5 mL/min, and the nominal injection volume was 300 pt. The various transfer lines, columns, viscometer and differential refractometer (the DRI detector) were contained in an oven maintained at 145° C. Solvent for the experiment was prepared by dissolving 6 grams of butylated hydroxytoluene as an antioxidant in 4 liters of Aldrich reagent grade 1,2,4-trichlorobenzene (TCB). The TCB mixture was then filtered through a 0.1 µm Teflon filter. The TCB was then degassed with an online degasser before entering the GPC-3D. Polymer solutions were prepared by placing dry polymer in a glass container, adding the desired amount of TCB, then heating the mixture at 160° C. with continuous shaking for about 2 hours. All quantities were measured gravimetrically. The TCB densities used to express the polymer concentration in mass/volume units were 1.463 g/ml at room temperature and 1.284 g/ml at 145° C. The injection concentration was from 0.5 to 2.0 mg/ml, with lower concentrations being used for higher molecular weight samples. Prior to running each sample the DRI detector and the viscometer were purged. Flow rate in the apparatus was then increased to 0.5 ml/minute, and the DRI was allowed to stabilize for 8 hours before injecting the first sample. The LS laser was turned on at least 1 to 1.5 hours before running the samples. The concentration, c, at each point in the chromatogram was calculated from the baseline-subtracted DRI signal, $I_{DRI}$, using the following equation:

$$c = K_{DRI} I_{DRI} / (dn/dc)$$

where $K_{DRI}$ is a constant determined by calibrating the DRI, and (dn/dc) is the refractive index increment for the system. The refractive index, n=1.500 for TCB at 145° C. and λ=690 nm. Units on parameters throughout this description of the GPC-3D method are such that concentration is expressed in g/cm³, molecular weight is expressed in daltons, and intrinsic viscosity is expressed in dL/g.

The LS detector was a Wyatt Technology High Temperature DAWN HELEOS. The molecular weight, M, at each point in the chromatogram was determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle θ, c is the polymer concentration determined from the DRI analysis, $A_2$ is the second virial coefficient. $P(\theta)$ is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system, which take the same value as the one obtained from DRI method. The refractive index, n=1.500 for TCB at 145° C. and λ=657 nm.

A high temperature Viscotek Corporation viscometer, which has four capillaries arranged in a Wheatstone bridge configuration with two pressure transducers, was used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the following equation:

$$\eta_s = c[\eta] + 0.3(c[\eta])^2$$

where c is concentration and was determined from the DRI output.

The branching index ($g'_{vis}$) was calculated using the output of the GPC-3D method as follows. The average intrinsic viscosity, $[\eta]_{avg}$, of the sample is calculated by:

$$[\eta]_{avg} = \frac{\Sigma c_i [\eta]_i}{\Sigma c_i}$$

where the summations are over the chromatographic slices, i, between the integration limits.

The branching index $g'_{vis}$ is defined as:

$$g'vis = \frac{[\eta]_{avg}}{k M_v^\alpha}$$

$M_v$ is the viscosity-average molecular weight based on molecular weights determined by LS analysis. Z average branching index ($g'_{Zave}$) is calculated using Ci=polymer concentration in the slice i in the polymer peak times the mass of the slice squared, $M_i^2$.

All molecular weights are weight average unless otherwise noted. All molecular weights are reported in daltons unless otherwise noted.

The parameters used in the data processing for the polypropylenes were as follows: K=0.0002288, a=0.705, dn/dc=0.1048 and A2=0.0006.

LCR is the capillary viscosity that was determined by ASTM D3835 at shear rate of 1200 sec⁻¹ and 204° C. using a die with a 1 mm diameter, 30 mm length 180° entry angle die.

Shore A hardness was measured Zwick automated durometer according to ASTM D2240.

Ultimate tensile strength ("UTS"), ultimate elongation ("UE"), and 100% modulus ("M100") were measured on injection molded plaques according to ASTM D638.

Microtensile ultimate tensile strength ("mUTS") was measured using microtensile specimens that were cut in the MD direction from 50 mm tapes prepared on a Haake according to ASTM D1708-98 using at Instron model 4204.

Microtensile ultimate elongation ("mUE") was measured using microtensile specimens that were cut in the MD direction from 50 mm tapes prepared on a Haake according to ASTM D1708-98 using at Instron model 4204.

Microtensile 100% modulus ("mM100") was measured using microtensile specimens that were cut in the MD direction from 50 mm tapes prepared on a Haake according to ASTM D1708-98 using at Instron model 4204.

Haake tapes were prepared on a Haake PolyLab system using a Rheocord (Model P-300), Rheomex (Model 252P) (single screw) equipped with and a 50 mm tape die (part 001-8544) and running Polylab Monitor v 4.17. Tapes were cast onto a cast film chill roll (Haake Chill Roll Type 002-6841). The materials were dried for 16 to 24 hours at 60° C. in a convection oven prior to testing. Machine set points were Zone 1: 180° C., Zone 2: 195° C., Zone 3: 210° C., Die Zone: 210° C. and 100 RPM. The film was cast onto a chilled roll (Haake Chill Roll Type 002-6841) with a roll temperature set-point of 30° C. that was maintained by a Thermofisher NesLab RTE 10 circulating chiller. The winder speed was varied in the range of 70 to 80 cm/min to maintain a final film gauge of 1.45 to 1.55 mm in the center of the tape.

Haake capillary preparation was used to obtain capillary extrusion data on Haake PolyLab system using a Rheocord (Model P-300), Rheomex (Model 252P) (single screw) equipped with die 557-3100 and capillary die 557-2551 (2 mm capillary diameter and 60 mm length) running software Polylab Monitor v 4.17 at different temperature profiles.

Rheotens melt strength measurements were performed with a Gottfert Rheotens model 71.97, performed on a melt strand generated from a Haake extruder according to the Haake capillary preparation method described above. The extruder was set to a constant RPM of 10 and had a temperature profile of 180° C./190° C./200° C./200° C. for polypropylene polymer samples and 200° C./200° C./220° C./200° C. for TPV samples. Rheotens take-up nips were located 10 cm beneath the capillary die exit and an acceleration of 12 mm/sec$^2$. Data was obtained and analyzed with Rheotens software v2.20.

The Compression Set (C-Set) at 22 hours and 70° C. and the Compression Set (C-Set) at 70 hours and 125° C. were measured using ISO 815.

Example 1

Different polypropylenes and polypropylene blends that were used in the examples were tested for various physical properties as described in Table 1. The polypropylene blends in Table 1 were blends of PP5341 and PPF180A using the amounts indicated in Table 1. Thus, for example, the 95/5 Blend in Table 2 utilized 95 wt % PP5341 and 5 wt % PPF180A. Likewise, the 85/15 Blend in Table 2 utilized 85 wt % PP5341 and 15 wt % PPF180A. BMWDPP-2 and BMWDPP-3 were broad molecular weight polypropylenes made as described herein and having the properties listed in Table 1 and Table 2. The capillary viscosity in Pa·s of the polypropylenes and polypropylene blends measured at different frequencies according to ASTM-D3835-02 are shown in Table 2.

TABLE 1

Polypropylene Properties

| | | PP5341 | 95/5 Blend | 90/10 Blend | 85/15 Blend | 75/25 Blend | BMWDPP-2 | BMWDPP-3 |
|---|---|---|---|---|---|---|---|---|
| MFR (2.16 kg; 230° C.) | g/10 min | 0.97 | 1.20 | 1.25 | 1.39 | 2.11 | 2.82 | 2.22 |
| HLMFR (21.6 kg; 230° C.) | g/10 min | 121 | 133 | 155 | 176 | 227 | 334 | 349 |
| Zero Shear Viscosity ($\eta 0$) | [Pa * s] | 27600 | — | — | — | — | 32000 | 38000 |
| Viscosity Ratio ($\eta 0.1/\eta 100$) | — | — | 16.45 | 15.27 | 15.06 | 14.39 | 13.10 | 19.20 | 20.37 |
| Mn | [Dalton] | 130677 | — | — | — | — | 90239 | 74528 |
| Mw | [Dalton] | 457173 | — | — | — | — | 452901 | 416286 |
| Mz | [Dalton] | 1139040 | — | — | — | — | 1503000 | 1373600 |
| Mw/Mn | — | 3.50 | — | — | — | — | 5.02 | 5.59 |

TABLE 2

Polypropylene Capillary Viscosity in Pa · s

| Frequency [Hz] | PP5341 | 95/5 Blend | 90/10 Blend | 85/15 Blend | 75/25 Blend | BMWDPP-2 | BMWDPP-3 |
|---|---|---|---|---|---|---|---|
| 10 | 4656 | 4469 | 4079 | 3866 | 3449 | 2551 | 2606 |
| 29 | 2468 | 2351 | 2187 | 2091 | 1919 | 1417 | 1443 |
| 100 | 1096 | 1065 | 1000 | 967 | 893 | 683 | 685 |
| 299 | 507 | 486 | 462 | 452 | 416 | 338 | 336 |
| 499 | 354 | 337 | 321 | 315 | 289 | 242 | 238 |
| 1000 | 217 | 203 | 192 | 191 | 172 | 158 | 152 |

As seen in Table 1, the BMWDPP-2 and BMWDPP-3 samples exhibited more shear thinning (as evidenced by the complex viscosity) and lower overall viscosity (as evidenced by the melt flow rate) than PP5341. Thus, even though the viscosities of the broad molecular weight distribution polypropylenes were lower than that of PP5341, as evidenced by the increased HLMFR of the BMWDPP-1 and BMWDPP-2 as compared to PP5341, the complex viscosity ($\eta 0$) was increased.

The blends of PP5341 and PPF180A in Table 1 illustrate that when high viscosity and low viscosity polypropylenes were blended together the overall blend viscosity could be reduced and the MWD could be increased. However, the broad molecular weight distribution polypropylenes (BMWDPP-2 and BMWDPP-3) still exhibited decreased viscosity (i.e., increased MFR and HLMFR) and increased shear thinning as compared to the blends.

FIG. 1 shows the melt strength (rheoten properties) of the polypropylenes and some of the 85/15 Blend and 75/25 Blend. The high viscosity (i.e., low MFR) of PP5341 can make it difficult to melt blend and process the polypropylene when making TPVs. Therefore, blends of PP5341 with lower viscosity resins are often used to make the polypropylene component of the TPV easier to melt blend and process. However, as illustrated in FIG. 1, the blends have decreased melt strength which can negatively impact the mechanical properties of the TPV. In contrast to the blend components, as seen in FIG. 1, the BMWDPPs have increased melt strength even though they have decreased viscosity (i.e., increased MFR) as compared to the polypropylene blends.

Example 2

Thermoplastic vulcanizates were prepared by dynamically mixing and vulcanizing in a twin-screw extruder the formulations described in Table 3. The formulations in Table 3 describe the amount of each ingredient in the formulation as parts per hundred parts of rubber ("phr"). The thermoplastic resin, granulated rubber, clay, zinc oxide, $SnCl_2$ masterbatch, and carbon black masterbatch were added to the extruder at the feed throat. The phenolic resin-in-oil was injected into the extruder after the feed throat and initial mixing zone. A first portion of the free oil ("Oil #1") was introduced to the extruder after the feed throat but before the phenolic resin-in-oil injection point and a second portion of the free process oil ("Oil #2") was introduced to the extruder after the phenolic resin-in-oil injection point. The formulations for the TPVs were selected to have a target hardness of 75 Shore A for the TPV.

TABLE 3

Example 2 Formulations (phr) and Physical Properties

| | TPV-604 | TPV-605 | TPV-606 | TPV-607 | TPV-608 | TPV-609 |
|---|---|---|---|---|---|---|
| Formulations in phr | | | | | | |
| V3666 | 175 | 175 | 175 | 175 | 175 | 175 |
| PP5341 | 45.25 | 36.2 | — | — | — | — |
| PPF180A | — | 9.05 | — | — | — | — |
| BMWDPP-2 | — | — | 45.25 | — | 45.25 | — |
| BMWDPP-3 | — | — | — | 45.25 | — | 45.25 |
| Clay | 42 | 42 | 42 | 42 | 42 | 42 |
| Black MB | 24 | 24 | 24 | 24 | 24 | 24 |
| $SnCl_2$ MB | 1.67 | 1.67 | 1.67 | 1.67 | 1.67 | 1.67 |
| RiO | 9.5 | 9.5 | 9.5 | 9.5 | 9.5 | 9.5 |
| ZnO | 1.5 | 1.5 | 1.5 | 1.5 | 1.5 | 1.5 |
| Oil #1 | 5.82 | 5.82 | 5.82 | 5.82 | 5.82 | 5.82 |
| Oil #2 | 52.33 | 52.33 | 52.33 | 52.33 | 52.33 | 52.33 |
| Total phr | 357.07 | 357.07 | 357.07 | 357.07 | 357.07 | 357.07 |
| TPV Physical Properties | | | | | | |
| LCR (Pa · s) | 82.59 | 81.85 | 88.15 | 86.9 | 86.87 | 82.54 |
| ESR (Ra) | 38.9 | 37.6 | 48.2 | 41.6 | 41.1 | 37 |
| Shore A | 75 | 75.9 | 75.4 | 77.2 | 76.4 | 76.1 |
| UTS (MPa) | 5.45 | 6.25 | 7.1 | 7.2 | 7.2 | 7.15 |
| UE (%) | 430 | 420 | 450 | 430 | 450 | 440 |
| M100 (MPa) | 3.35 | 3.35 | 3.5 | 3.7 | 3.65 | 3.65 |
| Compression Set (22 hr/70° C.) (%) | 29.5 | 31.4 | 29.7 | 29.4 | — | — |

As seen in Table 3, the sample TPVs all had the same polypropylene content of 45.25 phr and other than the type of polypropylene used to form the TPV, the formulations were the same. Thus, the only difference in the formulations for the TPVs in Example 1 was that TPV-604 used PP5341 to form the thermoplastic matrix phase, TPV-605 used an 80/20 blend of PP5341 and PPF180A to form the thermoplastic matrix phase, TPV-606 and TPV-608 used BMWDPP-2 to form the thermoplastic matrix phase, and TPV-607 and TPV-609 used BMWDPP-3 to form the thermoplastic matrix phase.

As seen in Table 3, the TPVs formed using the broad molecular weight distribution polypropylenes had improved tensile properties. That is, the ultimate tensile strength of the TPVs containing BMWDPP, i.e., TPV-606, TPV-607, TPV-608, and TPV-609, was more than 20% greater than that of the TPV containing neat PP5341 (i.e., TPV-604) and more than 10% greater than the TPV containing the 80/20 blend of polypropylenes (i.e., TPV-605). Additionally, the TPVs containing the BMWDPP exhibited increased 100% modulus and strain at break (ultimate elongation).

Figure 2:
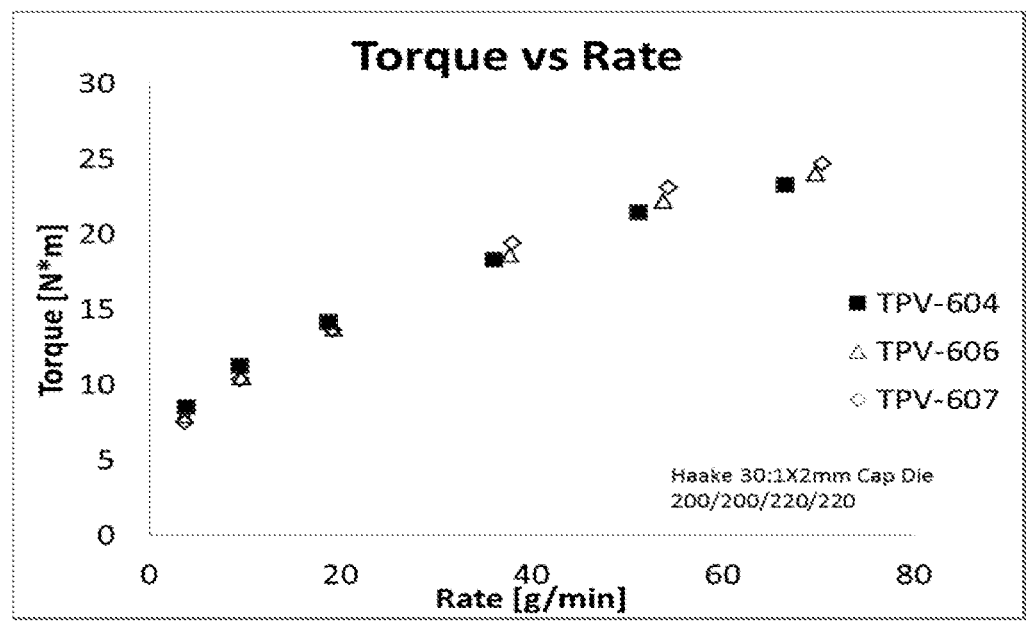
FIG. 2 shows a comparison of the torque and the rate of the Haake extrusion for TPVs of Example 2.
Figure 3:
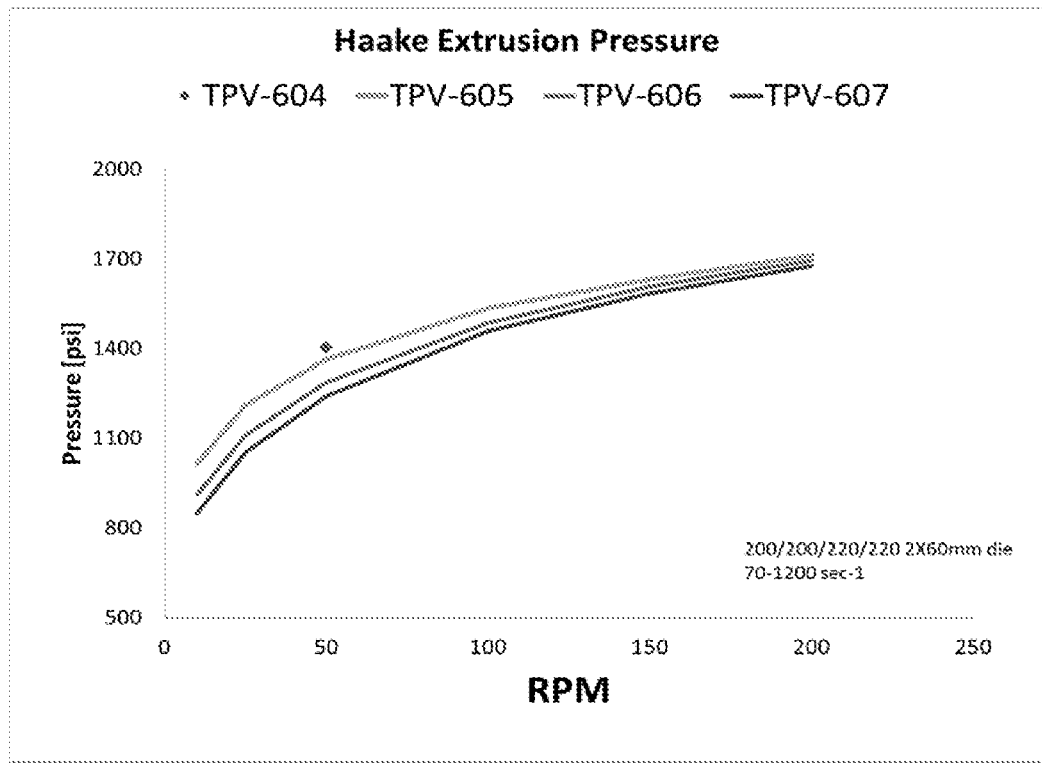
FIG. 3 shows a comparison of the Haake extrusion pressure and rate for TPVs of Example 2.

The processing and extrusion properties of the thermoplastic vulcanizates were tested using a Haake capillary extrusion test. Haake capillary extrusion data was obtained using a Haake PolyLab system using a Rheocord (Model P-300), Rheomex (Model 252P) (single screw) extruder equipped with die 557-3100 and capillary die 557-2551 (2 mm capillary diameter and 60 mm length) running software Polylab Monitor v 4.17. The zone temperature profile set points were as follows: Zone 1: 200° C.; Zone 2: 200° C.; Zone 3: 220° C.; Die: 220° C. The results of the capillary extrusion test are shown in Table 4A where the measurements were taken at different extruder RPMs as indicated in Tables 4A. The Haake capillary extrusion data was an average of between 30 seconds and 3 minutes of data, with data recoded at more than 1 Hz. Table 4B shows a comparison of the relative performance of the sample TPVs as compared to TPV-604 which utilized PP5341 at 100 RPM. FIG. 2 shows a comparison of the torque and the rate of the Haake extrusion for TPV-604, TPV-606, and TPV-607. FIG. 3 shows a comparison of the Haake extrusion pressure and rate for TPV-605, TPV-605, TPV-606, and TPV-607.

TABLE 4A

Example 2 Extrusion Properties (Haake Cap Properties)

| | TPV-604 | TPV-605 | TPV-606 | TPV-607 | TPV-608 | TPV-609 |
|---|---|---|---|---|---|---|
| Pressure | | | | | | |
| RPMRnd 10 | 934.4 | 933.3 | 839.8 | 802.9 | 840.8 | 763.9 |
| RPMRnd 25 | 1108.3 | 1108.9 | 1021.5 | 986.1 | 1026.1 | 946.0 |
| RPMRnd 50 | 1248.5 | 1243.4 | 1180.0 | 1158.1 | 1190.2 | 1093.7 |
| RPMRnd 100 | 1403.8 | 1392.5 | 1362.0 | 1357.5 | 1368.0 | 1276.1 |
| RPMRnd 150 | 1492.4 | 1478.4 | 1472.1 | 1473.8 | 1474.7 | 1381.7 |
| RPMRnd 200 | 1555.6 | 1548.0 | 1553.5 | 1556.6 | 1555.6 | 1456.5 |
| Motor Load | | | | | | |
| RPMRnd 10 | 5.3 | 5.2 | 4.9 | 4.7 | 4.6 | 4.1 |
| RPMRnd 25 | 7.0 | 6.8 | 6.6 | 6.5 | 6.3 | 5.7 |
| RPMRnd 50 | 8.8 | 8.7 | 8.5 | 8.5 | 8.8 | 7.4 |
| RPMRnd 100 | 11.4 | 11.5 | 11.6 | 12.1 | 11.9 | 10.2 |
| RPMRnd 150 | 13.4 | 13.7 | 13.9 | 14.4 | 13.7 | 12.2 |

TABLE 4A-continued

Example 2 Extrusion Properties (Haake Cap Properties)

| | TPV-604 | TPV-605 | TPV-606 | TPV-607 | TPV-608 | TPV-609 |
|---|---|---|---|---|---|---|
| RPMRnd 200 | 14.5 | 14.8 | 15.0 | 15.4 | 15.0 | 13.5 |
| | | | Rate | | | |
| RPMRnd 10 | 3.83 | 3.82 | 3.65 | 3.68 | 3.71 | 3.92 |
| RPMRnd 25 | 9.48 | 9.48 | 9.64 | 9.50 | 9.67 | 9.94 |
| RPMRnd 50 | 18.68 | 19.05 | 19.33 | 19.21 | 19.66 | 19.83 |
| RPMRnd 100 | 36.02 | 36.16 | 37.71 | 37.93 | 38.34 | 37.94 |
| RPMRnd 150 | 51.16 | 53.32 | 53.80 | 54.38 | 55.39 | 54.74 |
| RPMRnd 200 | 66.49 | 68.2 | 69.73 | 70.42 | 70.89 | 69.68 |
| | | | Specific Throughput | | | |
| RPMRnd 10 | 0.38 | 0.38 | 0.37 | 0.37 | 0.37 | 0.39 |
| RPMRnd 25 | 0.38 | 0.38 | 0.39 | 0.38 | 0.39 | 0.40 |
| RPMRnd 50 | 0.37 | 0.38 | 0.39 | 0.38 | 0.39 | 0.40 |
| RPMRnd 100 | 0.36 | 0.36 | 0.38 | 0.38 | 0.38 | 0.38 |
| RPMRnd 150 | 0.34 | 0.36 | 0.36 | 0.36 | 0.37 | 0.36 |
| RPMRnd 200 | 0.33 | 0.34 | 0.35 | 0.35 | 0.35 | 0.358 |

TABLE 4B

Example 2 Extrusion Properties (Relative Performance to TPV-604 at 100 RPM)

| | TPV-604 | TPV-605 | TPV-606 | TPV-607 | TPV-608 | TPV-609 |
|---|---|---|---|---|---|---|
| Pressure | 1 | 0.99 | 0.97 | 0.97 | 0.97 | 0.91 |
| Motor Load | 1 | 1.01 | 1.02 | 1.06 | 1.04 | 0.89 |
| Specific Throughput | 1 | 1.00 | 1.05 | 1.05 | 1.06 | 1.05 |

As seen in Tables 4A and 4B and in FIGS. 2 and 3 the TPVs formed using the broad molecular weight distribution polypropylenes exhibited improved extruder processability as compared to TPV-604 and TPV-605. That is, when making an end-use product from the TPV, the TPVs containing the broad molecular weight distribution polypropylene were easier to process than those that did not contain the broad molecular weight distribution polypropylene. As seen in Table 4A and in FIG. 3, at constant RPM and temperature profile, the extruder pressure was approximately 5% lower when processing TPV-606, TPV-607, TPV-608, and TPV-609 that contained broad molecular weight distribution polypropylene, than when processing the TPVs that contained fractional polypropylene (i.e., TPV-604 and TPV-605). The specific throughput was also increased when processing the broad molecular weight distribution polypropylene TPVs. The extrusion improvements seen in Tables 3A and 3B were obtained despite a nominal increase in the LCR viscosity of the TPV seen in Table 2.

Example 3

Thermoplastic vulcanizates were prepared as described above in Example 2, except that the TPVs were made with a target hardness of 60 Shore A. The formulations in Table 5 describe the amount of each ingredient in the formulation as parts per hundred parts of rubber ("phr").

TABLE 5

Example 2 Formulations (phr) and Physical Properties

| | TPV-610 | TPV-611 | TPV-612 | TPV-613 | TPV-614 | TPV-615 |
|---|---|---|---|---|---|---|
| | | | Formulations in phr | | | |
| V3666 | 175 | 175 | 175 | 175 | 175 | 175 |
| PP5341 | 32.68 | 26.144 | — | — | — | — |
| PPF180A | — | 6.536 | — | — | — | — |
| BMWDPP-2 | — | — | 32.68 | — | 32.68 | — |
| BMWDPP-3 | — | — | — | 32.68 | — | 32.68 |
| Clay | 42 | 42 | 42 | 42 | 42 | 42 |
| Black MB | 4.8 | 4.8 | 4.8 | 4.8 | 4.8 | 4.8 |
| SnCl$_2$ MB | 1.67 | 1.67 | 1.67 | 1.67 | 1.67 | 1.67 |
| RiO | 8.17 | 8.17 | 8.17 | 8.17 | 8.17 | 8.17 |
| ZnO | 1.5 | 1.5 | 1.5 | 1.5 | 1.5 | 1.5 |
| Oil #1 | 12.3 | 12.3 | 12.3 | 12.3 | 12.3 | 12.3 |
| Oil #2 | 51.24 | 51.24 | 51.24 | 51.24 | 51.24 | 51.24 |
| Total phr | 329.36 | 329.36 | 329.36 | 329.36 | 329.36 | 329.36 |
| | | | TPV Physical Properties | | | |
| LCR (Pa · s) | 84.67 | 84.88 | 86.62 | 86.13 | 81.31 | 82.59 |
| ESR (Ra) | 102 | 108 | 126 | 76.4 | 76.5 | 79.6 |
| Shore A | 57.9 | 58.2 | 60.5 | 62.7 | 61.5 | 61.6 |
| UTS (MPa) | 4.35 | 3.45 | 4.65 | 5.05 | 4.7 | 4.8 |
| UE (%) | 380 | 380 | 430 | 450 | 410 | 450 |
| M100 (MPa) | 1.9 | 2 | 1.95 | 2.25 | 2.1 | 2.4 |
| Compression Set (22 hr/70° C.) (%) | 28 | 22.7 | 25.2 | 30.7 | — | — |

Figure 4:
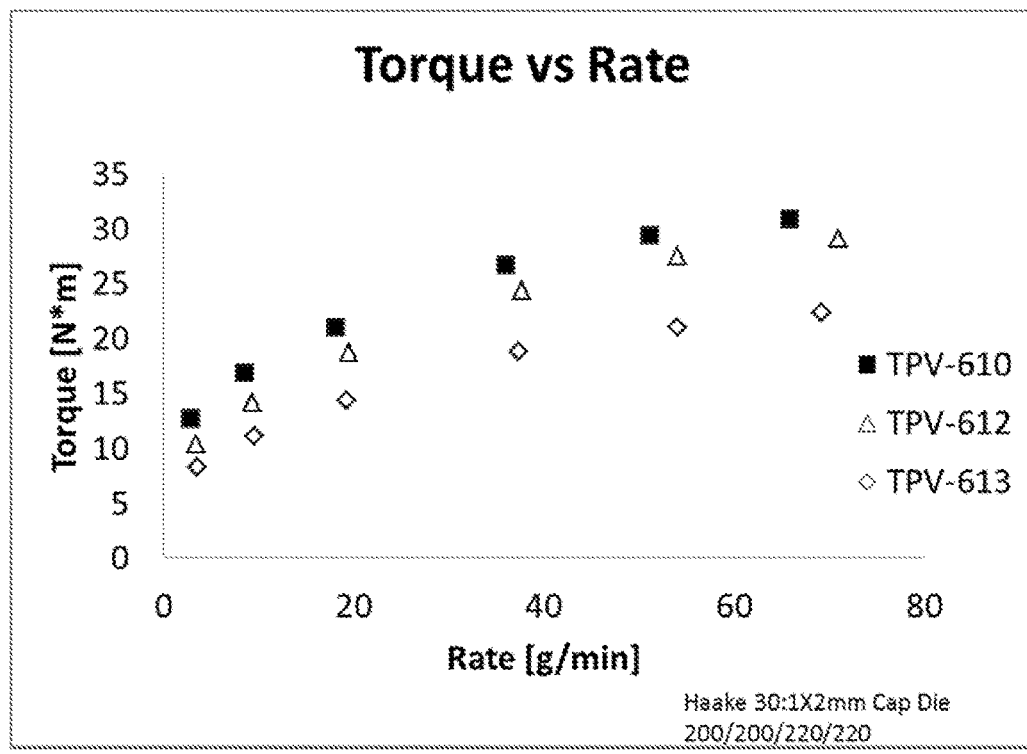
FIG. 4 shows a comparison of the torque and the rate of the Haake extrusion for TPVs of Example 3.

The Haake processing and extrusion properties of the thermoplastic vulcanizates were tested as described above with reference to Example 2 with the results shown in Tables 6A and 6B. FIG. 4 shows a comparison of the torque and the rate of the Haake extrusion for TPV-610, TPV-612, and TPV-613.

TABLE 6A

Example 3 Extrusion Properties (Haake Cap Properties)

| | TPV-610 | TPV-611 | TPV-612 | TPV-613 | TPV-614 | TPV-615 |
|---|---|---|---|---|---|---|
| Pressure | | | | | | |
| RPMRnd 10 | 958.3 | 102.0 | 852.4 | — | 824.8 | 813.2 |
| RPMRnd 25 | 1145.2 | 1196.6 | 1005.8 | 949.9 | 1002.8 | 993.4 |
| RPMRnd 50 | 1286.0 | 1334.0 | 1162.3 | 118.0 | 1158.1 | 1149.9 |
| RPMRnd 100 | 1433.6 | 1481.0 | 1336.2 | 1286.8 | 1329.8 | 1318.7 |
| RPMRnd 150 | 1521.2 | 1572.8 | 1441.9 | 1394.2 | 1436.1 | 1425.1 |
| RPMRnd 200 | 1583.1 | 1638.3 | 1524.6 | 1476.4 | 1519.2 | 1506.3 |
| Motor Load | | | | | | |
| RPMRnd 10 | 8.0 | 8.0 | 6.5 | — | 5.3 | 4.9 |
| RPMRnd 25 | 10.6 | 10.7 | 8.8 | 6.9 | 7.3 | 6.8 |
| RPMRnd 50 | 13.2 | 13.4 | 11.7 | 9.0 | 9.4 | 8.8 |
| RPMRnd 100 | 16.7 | 16.8 | 15.2 | 11.8 | 12.1 | 11.3 |
| RPMRnd 150 | 18.4 | 18.6 | 17.2 | 13.2 | 13.6 | 12.8 |
| RPMRnd 200 | 19.3 | 19.6 | 18.2 | 13.9 | 14.4 | 13.6 |
| Rate | | | | | | |
| RPMRnd 10 | 2.81 | 3.17 | 3.35 | — | 3.4 | 3.44 |
| RPMRnd 25 | 8.45 | 8.79 | 9.27 | 9.52 | 9.37 | 9.15 |
| RPMRnd 50 | 18.08 | 18.47 | 19.41 | 19.24 | 19.3 | 18.69 |
| RPMRnd 100 | 35.92 | 36.34 | 37.63 | 37.28 | 37.86 | 36.11 |
| RPMRnd 150 | 51.12 | 52.38 | 54 | 53.96 | 55.38 | 51.87 |
| RPMRnd 200 | 65.83 | 67.14 | 70.95 | 69.15 | 71.53 | 66.58 |
| Specific Throughput | | | | | | |
| RPMRnd 10 | 0.28 | 0.32 | 0.34 | 0.00 | 0.34 | 0.34 |
| RPMRnd 25 | 0.34 | 0.35 | 0.37 | 0.38 | 0.38 | 0.37 |
| RPMRnd 50 | 0.36 | 0.37 | 0.39 | 0.38 | 0.39 | 0.37 |
| RPMRnd 100 | 0.36 | 0.36 | 0.38 | 0.37 | 0.38 | 0.36 |
| RPMRnd 150 | 0.34 | 0.35 | 0.36 | 0.36 | 0.37 | 0.35 |
| RPMRnd 200 | 0.33 | 0.34 | 0.36 | 0.35 | 0.36 | 0.33 |

TABLE 6B

Example 3 Extrusion Properties (Relative Performance to TPV-610 at 100 RPM)

| | TPV-610 | TPV-611 | TPV-612 | TPV-613 | TPV-614 | TPV-615 |
|---|---|---|---|---|---|---|
| Pressure | 1 | 1.01 | 1.048 | 1.04 | 1.05 | 1.00 |
| Motor Load | 1 | 1.03 | 0.93 | 0.90 | 0.93 | 0.92 |
| Specific Throughput | 1 | 1.00 | 0.91 | 0.70 | 0.72 | 0.67 |

As seen in Table 5, the sample TPVs all had the same polypropylene content of 32.68 phr and other than the type of polypropylene used to form the TPV the formulations were the same. The ultimate tensile strength of the TPVs containing BMWDPP, i.e., TPV-612, TPV-613, TPV-614, and TPV-615, was more than 6% greater than that of the TPV containing neat PP5341 (i.e., TPV-610) and more than 16% greater than the TPV containing the 80/20 blend of polypropylenes (i.e., TPV-611). Additionally, the TPVs containing the BMWDPP exhibited increased 100% modulus and strain at break (ultimate elongation).

As seen in Table 6A, at constant RPM and temperature profile, the extruder pressure was at least 10% lower when processing TPV-612, TPV-613, TPV-614, and TPV-615 that contained broad molecular weight distribution polypropylene, than when processing the TPVs that contained fractional polypropylene (i.e., TPV-610 and TPV-611). The specific throughput was also increased when processing the broad molecular weight distribution polypropylene TPVs.

Example 4

Thermoplastic vulcanizates were prepared as described above in Example 2. The formulations in Table 7 describe the amount of each ingredient in the formulation as parts per hundred parts of rubber ("phr").

TABLE 7

Example 4 Formulations (phr) and Physical Properties

| | TPV-616 | TPV-617 | TPV-618 | TPV-619 | TPV-620 | TPV-621 | TPV-622 | TPV-623 | TPV-624 |
|---|---|---|---|---|---|---|---|---|---|
| Formulations in phr | | | | | | | | | |
| V3666 | 175 | 175 | 175 | 175 | 175 | 175 | 175 | 175 | 175 |
| PP5341 | 246.26 | 246.26 | 246.26 | — | — | — | — | — | — |
| BMWDPP-2 | — | — | — | 246.26 | — | — | — | 246.26 | — |
| BMWDPP-3 | — | — | — | — | 246.26 | 246.26 | 246.26 | — | 246.26 |
| Clay | 42 | 42 | 42 | 42 | 42 | 42 | 42 | 42 | 42 |
| Black MB | 21.12 | 21.12 | 21.12 | 21.12 | 21.12 | 21.12 | 21.12 | 21.12 | 21.12 |
| SnCl$_2$ MB | 2.22 | 2.22 | 2.22 | 2.22 | 2.22 | 2.22 | 2.22 | 2.22 | 2.22 |
| RiO | 15.33 | 15.33 | 15.33 | 15.33 | 15.33 | 15.33 | 15.33 | 15.33 | 15.33 |
| ZnO | 2 | 2 | 2 | 2 | 2 | 2 | 2 | 2 | 2 |
| Oil #1 | 7.84 | 7.84 | 7.84 | 7.84 | 7.84 | 7.84 | 7.84 | 7.84 | 7.84 |
| Oil #2 | 46.01 | 46.01 | 46.01 | 46.01 | 46.01 | 46.01 | 46.01 | 46.01 | 46.01 |
| Total phr | 557.78 | 557.78 | 557.78 | 557.78 | 557.78 | 557.78 | 557.78 | 557.78 | 557.78 |
| Extruder Properties | | | | | | | | | |
| Extruder Rate (kg/hr) | 90 | 110 | 115 | — | 90 | 110 | 115 | — | — |
| Motor Load (%) | 48 | 55 | 57.5 | — | 43 | 49.5 | 49 | — | — |
| TPV Physical Properties | | | | | | | | | |
| LCR (Pa · s) | 94.88 | 95.62 | 93.56 | 81.61 | 82.94 | 76.25 | 76.6 | 76.2 | 77.53 |
| ESR (Ra) | 71.1 | 41.8 | 51 | 103 | 82.5 | 59.8 | 74.2 | 48.1 | 60.3 |
| Shore A | 93.9 | 93.9 | 93.4 | 94.4 | 94 | 94.4 | 94.4 | 94.6 | 94.6 |
| UTS (MPa) | 17.75 | 19.45 | 18.45 | 15.8 | 15.1 | 16.45 | 15.55 | 16.05 | 16.45 |
| UE (%) | 570 | 600 | 590 | 510 | 520 | 520 | 520 | 520 | 530 |

TABLE 7-continued

Example 4 Formulations (phr) and Physical Properties

| | TPV-616 | TPV-617 | TPV-618 | TPV-619 | TPV-620 | TPV-621 | TPV-622 | TPV-623 | TPV-624 |
|---|---|---|---|---|---|---|---|---|---|
| M100 (MPa) | 10.25 | 10.3 | 10.05 | 10.65 | 11.25 | 10.7 | 10.65 | 10.9 | 11.35 |
| Compression Set (22 hr/70° C.) (%) | 44.7 | — | — | 51.5 | 52.8 | — | — | 50.9 | — |

Figure 5:
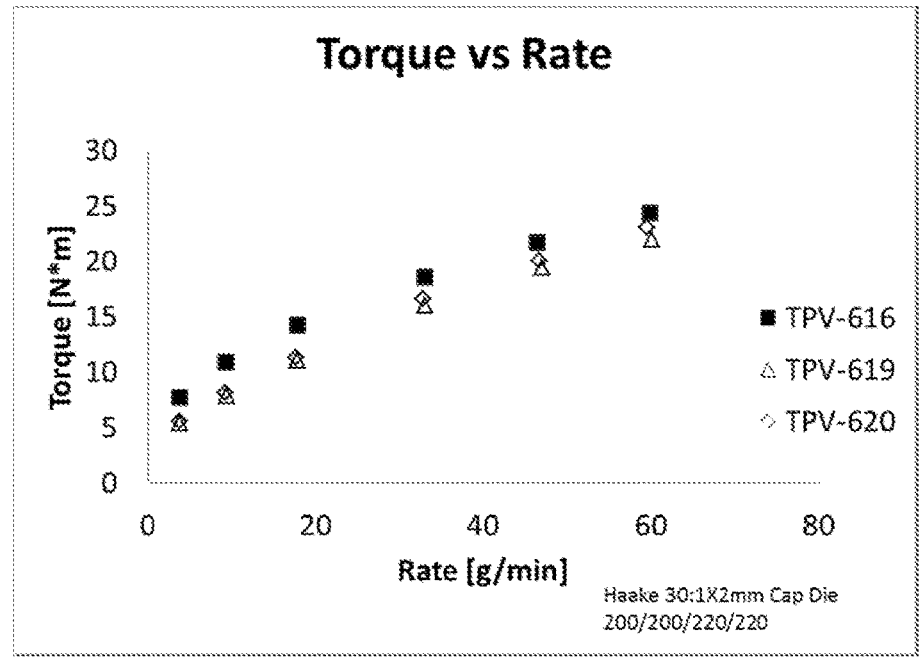
FIG. 5 shows a comparison of the torque and the rate of the Haake extrusion for TPVs of Example 4.

As seen in Table 7, the TPVs made with the processing and extrusion properties of the thermoplastic vulcanizates were tested as described above with reference to Example 2 with the results shown in Table 8 and FIG. 5.

TABLE 8

Example 4 Extrusion Properties (Haake Cap Properties)

| | TPV-616 | TPV-619 | TPV-620 |
|---|---|---|---|
| | Pressure | | |
| RPMRnd 50 | 1160.167 | 1480.214 | 1174.067 |
| | Motor Load | | |
| RPMRnd 50 | 7.315 | 8.97 | 7.220333 |
| | Rate | | |
| RPMRnd 50 | 17.8 | 17.76 | 17.8 |

Example 5

Thermoplastic vulcanizates were prepared as described above in Example 2. The formulations in Table 9 describe the amount of each ingredient in the formulation as parts per it) hundred parts of rubber ("phr").

TABLE 9

Example 5 Formulations (phr) and Physical Properties

| | TPV-625 | TPV-626 | TPV-627 | TPV-628 | TPV-629 |
|---|---|---|---|---|---|
| | Formulations in phr | | | | |
| V3666 | 175 | 175 | 175 | 175 | 175 |
| BMWDPP-2 | 116.06 | — | 116.06 | — | 116.06 |
| BMWDPP-3 | — | 116.06 | — | 116.06 | — |
| Clay | 12 | 12 | 12 | 12 | 12 |
| Black MB | 27.49 | 27.49 | 27.49 | 27.49 | 27.49 |
| SnCl$_2$ MB | 1.67 | 1.67 | 1.67 | 1.67 | 1.67 |
| RiO | 5.26 | 5.26 | 5.26 | 5.26 | 5.26 |
| ZnO | 1.46 | 1.46 | 1.46 | 1.46 | 1.46 |
| Oil #1 | 23.65 | 23.65 | 23.65 | 23.65 | 23.65 |
| Oil #2 | 57.33 | 57.33 | 57.33 | 57.33 | 57.33 |
| Total phr | 419.92 | 419.92 | 419.92 | 419.92 | 419.92 |
| | TPV Physical Properties | | | | |
| LCR (Pa · s) | 69.42 | 69.91 | 64.51 | 66.53 | 69.42 |
| ESR (Ra) | 47.2 | 49.8 | 40.2 | 74.3 | 47.2 |
| Shore A | 88.7 | 89.7 | 88.1 | 90.3 | 88.7 |
| UTS (MPa) | 11.35 | 11.4 | 9.7 | 9.6 | 11.35 |
| UE (%) | 420 | 430 | 440 | 470 | 420 |
| M100 (MPa) | 6.4 | 6.7 | 6.45 | 7 | 6.4 |
| Compression Set (22 hr/70° C.) (%) | — | 39.8 | 41.1 | 42.3 | 45.2 |

Figure 6:
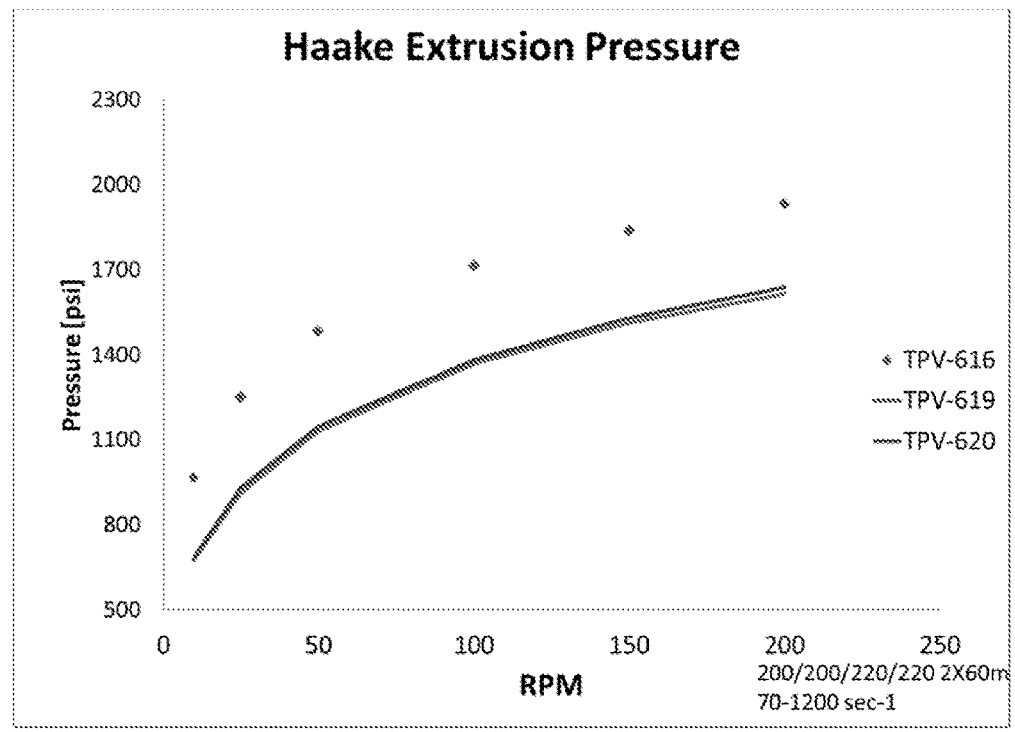
FIG. 6 shows a comparison of the Haake extrusion pressure and rate for TPVs of Example 4.

The processing and extrusion properties of the thermoplastic vulcanizates were tested as described above with reference to Example 2 with the results shown in Tables 10A and 10B and in FIGS. 5 and 6.

TABLE 10A

Example 5 Extrusion Properties (Haake Cap Properties)

| | TPV-625 | TPV-626 | TPV-627 | TPV-628 | TPV-629 |
|---|---|---|---|---|---|
| | Pressure | | | | |
| RPMRnd 10 | — | 591.9 | 586.6 | 546.2 | 551.2 |
| RPMRnd 25 | 772.8 | 783.9 | 782.9 | 741.2 | 743.6 |
| RPMRnd 50 | 925.3 | 961.6 | 963.8 | 916.5 | 924.2 |
| RPMRnd 100 | 1088.9 | 1172.3 | 1176.4 | 1119.6 | 1137.1 |
| RPMRnd 150 | 1182.4 | 1294.0 | 1298.7 | 1235.1 | 1261.1 |
| RPMRnd 200 | 1230.3 | 1374.2 | 1382.1 | 1319 | 1347.7 |
| | Motor Load | | | | |
| RPMRnd 10 | — | 3.1 | 2.9 | 2.6 | 2.8 |
| RPMRnd 25 | 4.0 | 4.5 | 4.3 | 4.0 | 4.3 |
| RPMRnd 50 | 5.7 | 6.2 | 6.0 | 5.5 | 5.9 |
| RPMRnd 100 | 8.5 | 8.7 | 8.5 | 7.8 | 8.4 |
| RPMRnd 150 | 10.3 | 10.4 | 10.1 | 9.5 | 10.2 |
| RPMRnd 200 | 11.1 | 11.8 | 11.4 | 10.8 | 11.4 |
| | Rate | | | | |
| RPMRnd 10 | — | 3.75 | 3.74 | 3.76 | 3.73 |
| RPMRnd 25 | 9.99 | 9.3 | 9.05 | 9.19 | 9.22 |
| RPMRnd 50 | 19.8 | 17.94 | 17.89 | 18.07 | 18.03 |
| RPMRnd 100 | 38.75 | 33.2 | 32.86 | 33.26 | 33.93 |
| RPMRnd 150 | 55.79 | 47.03 | 46.17 | 46.86 | 48.01 |
| RPMRnd 200 | 67.77 | 58.87 | 58.46 | 59.57 | 60.68 |
| | Specific Throughput | | | | |
| RPMRnd 10 | 0.00 | 0.38 | 0.37 | 0.38 | 0.37 |
| RPMRnd 25 | 0.40 | 0.37 | 0.36 | 0.37 | 0.37 |
| RPMRnd 50 | 0.40 | 0.36 | 0.36 | 0.36 | 0.36 |
| RPMRnd 100 | 0.39 | 0.33 | 0.33 | 0.33 | 0.34 |
| RPMRnd 150 | 0.37 | 0.31 | 0.31 | 0.31 | 0.32 |
| RPMRnd 200 | 0.34 | 0.29 | 0.29 | 0.30 | 0.30 |

TABLE 10B

Example 5 Extrusion Properties (Relative Performance to TPV-625 at 100 RPM)

| | TPV-625 | TPV-626 | TPV-627 | TPV-628 | TPV-629 |
|---|---|---|---|---|---|
| Pressure | 1 | 1.08 | 1.08 | 1.03 | 1.04 |
| Motor Load | 1 | 1.03 | 1.00 | 0.92 | 0.99 |
| Specific Throughput | 1 | 0.91 | 0.90 | 0.91 | 0.91 |

Example 6

TPVs were made by a process similar to that used in Example 2, with the formulations shown in Table 11 in phr. The formulations for TPV-N07 and TPV-N015 are the same;

however, TPV-N015 was made using an extruder screw that enabled more aggressive mixing than that used with TPV-N07. The extruder screw used to make TPV-N17 was the same as that used to make TPV-N15. Physical properties of the TPVs are reported in Table 12.

Figure 7:
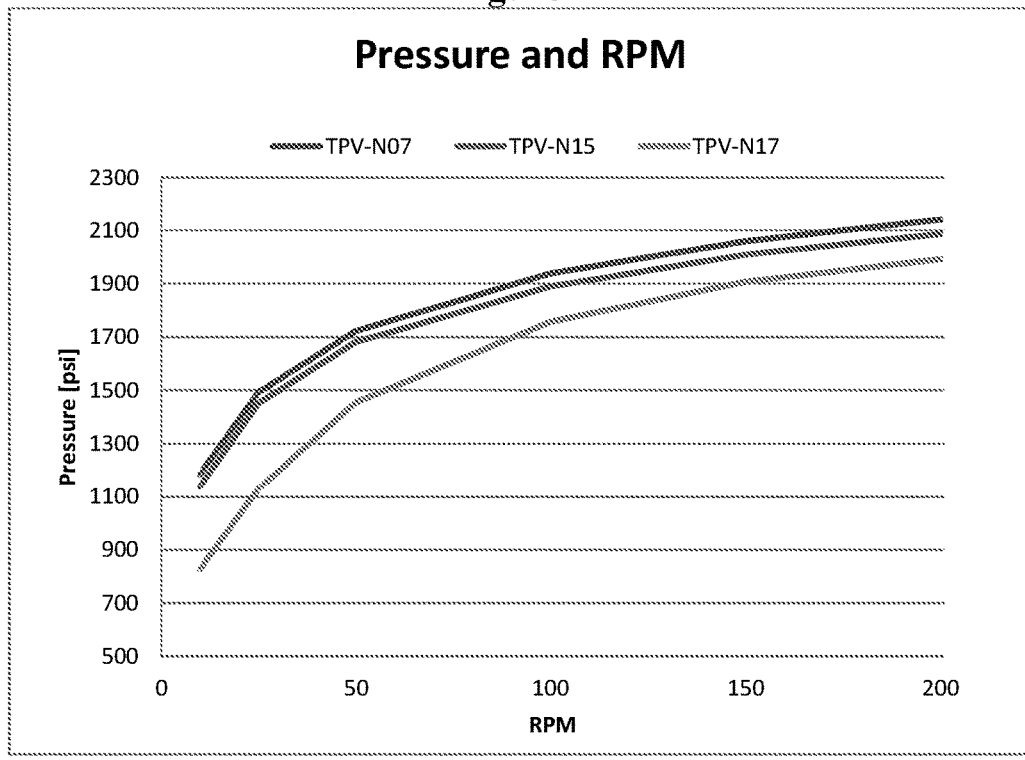
FIG. 7 shows a comparison of the Haake extrusion pressure and rate for TPVs of Example 6.

A Haake capillary extrusion test was conducted on the samples of Example 6 using a Haake PolyLab system as in Example 2, with the zone set points at 180/200/200/200/200. FIG. 7 shows the Haake extrusion pressure over varied RPM in a Haake extrusion test for the TPVs of Example 6. As seen in FIG. 7, the TPV produced using the BMWDPP had reduced extrusion pressure as compared to the samples that contained PP556E.

TABLE 11

Formulations in phr for Example 6

|  | TPV-N07 | TPV-N15 | TPV-N17 |
|---|---|---|---|
| V3666 | 175 | 175 | 175 |
| PP556E | 180 | 180 | — |
| BMWDPP-3 | — | — | 180 |
| VM3020 | 25 | 25 | 25 |
| Clay | 42 | 42 | 42 |
| Black MB | 17.4 | 17.4 | 17.4 |
| ZnO | 1.5 | 1.5 | 1.5 |
| SnCl$_2$ MB | 1.67 | 1.67 | 1.67 |
| RIO | 14.8 | 14.8 | 14.8 |
| Oil #1 | 12.6 | 12.6 | 12.6 |
| Oil #2 | 39.3 | 39.3 | 39.3 |
| Total phr | 509.27 | 509.27 | 509.27 |

TABLE 12

Example 6 TPV Physical Properties

|  | TPV-N07 | TPV-N15 | TPV-N17 |
|---|---|---|---|
| Hardness (Shore A) | 78 | 90 | 80 |
| C-Set, 22 hrs @ 70° C. | 50.9% | 53.8% | 59.3% |
| MD M100 (MPa) | 9.39 | 9.50 | 10.12 |
| MD UTS (MPa) | 20.95 | 20.71 | 21.17 |
| MD UE (%) | 565.52 | 544.74 | 535.50 |
| MD Break Energy | 8.24 | 7.83 | 8.06 |
| TD M100 (MPa) | 8.38 | 8.53 | 8.66 |
| TD UTS (MPa) | 19.82 | 18.97 | 18.56 |
| TD UE (%) | 595.16 | 549.36 | 535.88 |
| TD Break Energy | 7.98 | 7.17 | 7.00 |

As illustrated in the above examples, the broad molecular weight distribution polypropylene exhibited more shear thinning and lower viscosity than conventional fractional polypropylenes. This allowed the TPVs made using the broad molecular weight distribution polypropylene to have improved extruder processability and in some cases improved tensile properties relative to TPVs made using fractional polypropylene.

For purposes of convenience, various specific test procedures are identified above for determining certain properties. However, when a person of ordinary skill reads this patent and wishes to determine whether a composition or polymer has a particular property identified in a claim, then any published or well-recognized method or test procedure can be followed to determine that property, although the specifically identified procedure is preferred. Each claim should be construed to cover the results of any of such procedures, even to the extent different procedures can yield different results or measurements. Thus, a person of ordinary skill in the art is to expect experimental variations in measured properties that are reflected in the claims.

Certain embodiments and features have been described using a set of numerical upper limits and a set of numerical lower limits. It should be appreciated that ranges from any lower limit to any upper limit are contemplated unless otherwise indicated. All numerical values are "about" or "approximately" the indicated value, and take into account experimental error and variations that would be expected by a person having ordinary skill in the art.

As used herein, the phrases "substantially no," and "substantially free of" are intended to mean that the subject item is not intentionally used or added in any amount, but may be present in very small amounts existing as impurities resulting from environmental or process conditions.

All patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

We claim:

1. A thermoplastic vulcanizate comprising:
   (i) a rubber comprising an ethylene-propylene diene rubber and 5-ethylidene-2-norbornene ENB diene content;
   (ii) a broad molecular weight distribution polypropylene, where the broad molecular weight distribution polypropylene has:
      (a) a molecular weight distribution (Mw/Mn) from 5 to 10;
      (b) a melt flow rate (ASTM D1238 Condition L at 230° C. and 2.16 kg) of greater than 1 g/10 min; and
      (c) a weight average molecular weight (Mw) of greater than 380,000 daltons; and
   (iii) a hydrocarbon oil in the amount of 5 to 300 phr;
   wherein the thermoplastic vulcanizate has an ultimate elongation (ASTM D638) of greater than 400%; wherein the thermoplastic vulcanizate has a Shore A hardness of greater than 50; wherein the thermoplastic vulcanizate comprises a rubber phase that is dispersed and at least partially cross-linked within a continuous thermoplastic component that comprises the broad molecular weight distribution polypropylene, wherein the thermoplastic vulcanizate further comprises a propylene-based elastomer comprising propylene and from about 5 to about 30 wt % of one or more comonomers selected from ethylene and/or C$_4$-C$_{12}$ α-olefins, and wherein the propylene-based elastomer is a propylene-ethylene copolymer that has from about 9 wt % to about 15 wt % ethylene-derived units and has: (i) a melt index of from about 0.5 to about 3.0 g/10 min; (ii) a melt flow rate of from about 0.5 to about 7.0 g/10 min; and (iii) a Mooney viscosity of from about 10 to about 40.

2. The thermoplastic vulcanizate of claim 1, wherein the thermoplastic vulcanizate comprises from about 7 wt % to about 45 wt % of the rubber, based on the total weight of the thermoplastic vulcanizate.

3. The thermoplastic vulcanizate of claim 1, wherein the thermoplastic vulcanizate comprises from about 3 wt % to about 60 wt % of the broad molecular weight distribution polypropylene, based on the total weight of the thermoplastic vulcanizate.

4. The thermoplastic vulcanizate of claim 1, wherein the broad molecular weight distribution polypropylene has a melt strength of at least 20 cN determined using an extensional rheometer at 190° C.

5. The thermoplastic vulcanizate of claim 1, wherein the broad molecular weight distribution polypropylene has a molecular weight distribution greater than 5.

6. The thermoplastic vulcanizate of claim 1, wherein the broad molecular weight distribution polypropylene has a viscosity ratio of greater than or equal to 17 as determined at an angular frequency ratio of 0.1 and at an angular frequency ratio of 100 rad/s (at an angular frequency ratio of 0.1 to 100 rad/s) at a fixed strain of 10% at 190° C.

7. The thermoplastic vulcanizate of claim 1, wherein the broad molecular weight distribution polypropylene has a melt flow rate greater than 2 g/10 min.

8. The thermoplastic vulcanizate of claim 1, wherein the broad molecular weight distribution polypropylene has a high load MFR (ASTM D1338 at 230° C.; 21.6 kg) of greater than 150 g/10 min.

9. The thermoplastic vulcanizate of claim 1, wherein the broad molecular weight distribution polypropylene has a zero shear viscosity of greater than 28,000 Pa·s.

10. The thermoplastic vulcanizate of claim 1, wherein the broad molecular weight distribution polypropylene has a number average molecular weight (Mn) of greater than 55,000 daltons.

11. The thermoplastic vulcanizate of claim 1, wherein the broad molecular weight distribution polypropylene has a weight average molecular weight (Mw) of greater than 400,000 daltons.

12. The thermoplastic vulcanizate of claim 1, wherein the broad molecular weight distribution polypropylene has a z-average molecular weight (Mz) of greater than 1,000,000.

13. The thermoplastic vulcanizate of claim 1, wherein the broad molecular weight distribution polypropylene is made by a process that comprises contacting propylene monomers at a temperature and a pressure in the presence of catalyst system to produce a propylene resin comprising at least 50 mol % propylene, wherein the catalyst system comprises:
  a Ziegler-Natta catalyst comprising a non-aromatic internal electron donor;
  a first external electron donor having the formula $R^1{}_2Si(OR^2)_2$, wherein each $R^1$ is independently a hydrocarbyl radical comprising from 1 to 10 carbon atoms in which the carbon adjacent to the Si is a secondary or a tertiary carbon atom, and wherein each $R^2$ is independently a hydrocarbyl radical comprising from 1 to 10 carbon atoms; and
  a second external electron donor having the formula $R^3{}_nSi(OR^4)_{4-n}$, wherein each $R^3$ and $R^4$ are independently a hydrocarbyl radical comprising from 1 to 10 carbon atoms, and n is 1, 2, or 3; and
  where the second external electron donor is different than the first external electron donor.

14. The thermoplastic vulcanizate of claim 1, wherein the thermoplastic vulcanizate comprises from about 10 wt % to about 55 wt % oil, based on the total weight of the thermoplastic vulcanizate.

15. A thermoplastic vulcanizate comprising a rubber phase dispersed and at least partially cross-linked in a continuous thermoplastic phase, the thermoplastic vulcanizate having:
  (a) an ultimate elongation (ASTM D638) of greater than 400%;
  (b) a Shore A hardness of greater than 50; and
  (c) an ultimate tensile strength (ASTM D638) of greater than 7 MPa;
  wherein the rubber phase comprises an ethylene-propylene diene rubber that has about 64 wt % ethylene content (as measured by ASTM D3900) and 4.5 wt % 5-ethylidene-2-norbornene ENB diene content (as measured by ASTM D6047) and the thermoplastic phase comprises a broad molecular weight distribution polypropylene having:
    (i) a molecular weight distribution (Mw/Mn) from 5 to 10;
    (ii) a melt flow rate (ASTM D1238 Condition L at 230° C. and 2.16 kg) of greater than 2 g/10 min; and
    (iii) a weight average molecular weight (Mw) of greater than 410,000 daltons.

16. The thermoplastic vulcanizate of claim 15, wherein the thermoplastic vulcanizate comprises from about 7 wt % to about 45 wt % of the rubber phase, based on the total weight of the thermoplastic vulcanizate.

17. The thermoplastic vulcanizate of claim 15, wherein the thermoplastic vulcanizate comprises from about 3 wt % to about 60 wt % of the broad molecular weight distribution polypropylene, based on the total weight of the thermoplastic vulcanizate.

18. The thermoplastic vulcanizate of claim 15, wherein the broad molecular weight distribution polypropylene has a melt strength of at least 20 cN determined using an extensional rheometer at 190° C.

19. The thermoplastic vulcanizate of claim 15, wherein the broad molecular weight distribution polypropylene has a viscosity ratio of greater than or equal to 17 as determined at an angular frequency ratio of 0.1 and at an angular frequency ratio of 100 rad/s (at an angular frequency ratio of 0.1 to 100 rad/s) at a fixed strain of 10% at 190° C.

20. The thermoplastic vulcanizate of claim 15, wherein the broad molecular weight distribution polypropylene has a zero shear viscosity of greater than 28,000 Pa·s.

* * * * *